(12) United States Patent
Kim et al.

(10) Patent No.: US 10,595,067 B2
(45) Date of Patent: Mar. 17, 2020

(54) VIDEO PROVIDING APPARATUS, VIDEO PROVIDING METHOD, AND COMPUTER PROGRAM

(71) Applicants: NAVER BUSINESS PLATFORM CORPORATION, Seongnam-si (KR); NAVER CORPORATION, Seongnam-si (KR)

(72) Inventors: Gi Joong Kim, Seongnam-si (KR); Eun Sun Shin, Seongnam-si (JP); Ha Neul Lee, Seongnam-si (KR); Wan Jong Suh, Seongnam-si (KR); Jung Doo Park, Seongnam-si (KR); Ki Young Park, Seongnam-si (KR); Min Hee Choi, Seongnam-si (KR); Yoo Sub Song, Seongnam-si (KR)

(73) Assignees: NAVER Business Platform Corporation, Seongnam-si (KR); NAVER Corporation, Seongnam-si (KR)

( * ) Notice: Subject to any disclaimer, the term of this patent is extended or adjusted under 35 U.S.C. 154(b) by 0 days.

(21) Appl. No.: 15/872,670

(22) Filed: Jan. 16, 2018

(65) Prior Publication Data

US 2018/0160157 A1 Jun. 7, 2018

Related U.S. Application Data

(63) Continuation of application No. PCT/KR2016/006099, filed on Jun. 9, 2016.

(30) Foreign Application Priority Data

Jul. 16, 2015 (KR) ........................ 10-2015-0101106

(51) Int. Cl.
*H04N 21/242* (2011.01)
*H04N 5/278* (2006.01)
(Continued)

(52) U.S. Cl.
CPC .......... *H04N 21/242* (2013.01); *H04N 5/278* (2013.01); *H04N 21/26208* (2013.01);
(Continued)

(58) Field of Classification Search
None
See application file for complete search history.

(56) References Cited

U.S. PATENT DOCUMENTS

| 5,731,847 A | 3/1998 | Tsukagoshi |
| 7,992,183 B1 * | 8/2011 | Harrenstien ........... G06Q 10/00 725/137 |

(Continued)

FOREIGN PATENT DOCUMENTS

| CN | 104093037 A | 10/2014 |
| JP | 08322046 A | 12/1996 |

(Continued)

OTHER PUBLICATIONS

Int'l Search Report issued in Int'l. App. No. PCT/KR2016/006099, dated Aug. 23, 2016.
(Continued)

*Primary Examiner* — Michael R Telan
(74) *Attorney, Agent, or Firm* — Greer Burns & Crain, Ltd.

(57) ABSTRACT

A method for providing a video to a viewer terminal through a communication network includes: receiving, by a communication unit, an original video signal including information of an original video; generating, by a controller, a delayed video signal including information of a delayed video in which the original video is delayed by a first time period; transmitting, by the communication unit, the original video signal to a subtitler terminal; receiving, by the communication unit from the subtitler terminal, a subtitle signal including information of subtitles with respect to the original video
(Continued)

and a subtitle delay signal including information for delaying a display of the subtitles; generating, by the controller, a display timing signal indicating a timing of displaying the subtitles on the delayed video, based on the subtitle delay signal; transmitting, by the communication unit, the delayed video signal to a viewer terminal; and transmitting, by the communication unit, the display timing signal and the subtitle signal to the viewer terminal.

20 Claims, 21 Drawing Sheets

(51) Int. Cl.
  *H04N 21/488*   (2011.01)
  *H04N 21/41*    (2011.01)
  *H04N 21/262*   (2011.01)
  *H04N 21/43*    (2011.01)

(52) U.S. Cl.
  CPC ......... *H04N 21/41* (2013.01); *H04N 21/4307* (2013.01); *H04N 21/488* (2013.01); *H04N 21/4884* (2013.01)

(56) References Cited

U.S. PATENT DOCUMENTS

| | | | | |
|---|---|---|---|---|
| 2010/0128103 | A1* | 5/2010 | Sim | H04N 7/147 348/14.02 |
| 2010/0194979 | A1* | 8/2010 | Blumenschein | G06F 17/289 348/468 |
| 2012/0275761 | A1  | 11/2012 | Li et al. | |
| 2012/0316860 | A1  | 12/2012 | Reitan | |
| 2013/0219444 | A1* | 8/2013 | Kitazato | H04N 21/4305 725/110 |
| 2014/0201631 | A1* | 7/2014 | Pornprasitsakul | G06F 3/0484 715/716 |
| 2017/0347137 | A1* | 11/2017 | Tsukagoshi | H04N 21/434 |

FOREIGN PATENT DOCUMENTS

| | | |
|---|---|---|
| JP | 2006-324779 A | 11/2006 |
| JP | 2007324872 A | 12/2007 |
| JP | 2008228242 A | 9/2008 |
| JP | 2012-181358 A | 9/2012 |
| KR | 10-2002-0005523 A | 1/2002 |
| KR | 10-0523761 B1 | 10/2005 |
| KR | 10-1192207 B1 | 10/2012 |
| KR | 10-2015-0017480 A | 2/2015 |
| WO | WO 2013/133477 A1 | 9/2013 |
| WO | WO-2013133477 A1 * | 9/2013 ......... H04N 21/2223 |

OTHER PUBLICATIONS

Adult Windows, Oct. 2009 issue (vol. 26), Oct. 1, 2009, Inforest Co., Ltd, pp. 36-39 (with partial English translation of relevant portions).

Office Action issued in corresponding Japanese Patent application No. 2018-521804, dated Dec. 11, 2018.

Office Action dated Oct. 29, 2019 corresponding to Chinese Patent application No. 201680041973.7 (with translation).

* cited by examiner

VIDEO PROVIDING APPARATUS, VIDEO PROVIDING METHOD, AND COMPUTER PROGRAM

CROSS-REFERENCE TO RELATED APPLICATIONS

This application is a continuation of International Application No. PCT/KR2016/006099, filed Jun. 9, 2016, which claims benefit of Korean Patent Application No. 10-2015-0101106, filed Jul. 16, 2015, the entire content of which is incorporated herein by reference.

BACKGROUND OF THE INVENTION

Field of the Invention

Embodiments of the present disclosure relate to a video providing apparatus, a video providing method, and a computer program.

Description of Related Art

According to the development of image processing techniques and electronic communication techniques, people who wish to provide a video are now able to broadcast through a communication network, such as the Internet, by using an electronic apparatus, and people who wish to watch a video are also now able to watch the video through the communication network.

However, most videos include dialogue or text using a particular language, and only a person who understands the particular language can fully enjoy the videos. In a video that is already produced, subtitles that are made later may be added to and reproduced together with the video, but it is difficult to provide subtitles for a video broadcasted live.

Information disclosed in this background section was already known to the inventors before achieving the inventive concept or is technical information acquired in the process of achieving the inventive concept. Therefore, it may contain information that does not form the prior art that is already known to the public in this country.

SUMMARY OF THE INVENTION

Provided are a video providing apparatus, a video providing method, and a computer program, wherein an original video is provided to a viewer terminal by delaying the original video by a certain time, and subtitles are provided to the viewer terminal by receiving the subtitles from a subtitler terminal during the delayed time.

Provided are a video providing apparatus, a video providing method, and a computer program, wherein information about a timing of displaying subtitles is provided to the viewer terminal together with the subtitles such that the subtitles are displayed at the right timing on a video provided to the viewer terminal.

According to an aspect of an embodiment, a video providing method includes: receiving, by a communication unit, an original video signal including information of an original video; generating, by a controller, a delayed video signal including information of a delayed video in which the original video is delayed by a first time period; transmitting, by the communication unit, the original video signal to a subtitler terminal; receiving, by the communication unit from the subtitler terminal, a subtitle signal including information of subtitles with respect to the original video and a delay signal including information for delaying a display of the subtitles; generating, by the controller, a display timing signal indicating a timing of displaying the subtitles on the delayed video, based on the subtitle delay signal; transmitting, by the communication unit, the delayed video signal to a viewer terminal; and transmitting, by the communication unit, the display timing signal and the subtitle signal to the viewer terminal.

According to an aspect of another embodiment, a video providing method includes: receiving, by a communication unit, an original video signal including information of an original video from a server; outputting, by an output unit, the original video; receiving, by an input unit, subtitles with respect to the original video; generating, by a controller, a subtitle signal comprising information of the subtitles with respect to the original video, and generating a delay signal including information for delaying a display of the subtitles; and transmitting, by the communication unit, the subtitle signal and the subtitle delay signal to the server.

These general and specific embodiments may be implemented by using a system, a method, a computer program, or a combination of the system, the method, and the computer program.

According to an aspect of another embodiment, a video providing apparatus includes: a communication unit configured to receive an original video signal including information of an original video, transmit the original video signal to a subtitler terminal, and receive, from the subtitler terminal, a subtitle signal including information of subtitles with respect to the original video and a delay signal including information for delaying a display of the subtitles; and a controller configured to generate a delayed video signal including information of a delayed video in which the original video is delayed by a first time period, and generate a display timing signal indicating a timing when the subtitles are to be displayed on the delayed video based on the subtitle delay signal, wherein the communication unit is further configured to transmit the delayed video signal, the display timing signal, and the subtitle signal to a viewer terminal.

These and/or other aspects will become apparent and more readily appreciated from the following description of the embodiments, taken in conjunction with the accompanying drawings.

According to the present disclosure, a video providing apparatus, a video providing method, and a computer program may provide an original video to a viewer terminal by delaying the original video by a certain time, and provide subtitles to the viewer terminal by receiving the subtitles from a subtitler terminal during the delayed time.

Also, a video providing apparatus, a video providing method, and a computer program may provide information about the timing of displaying subtitles to the viewer terminal together with the subtitles such that the subtitles are displayed at the right timing on a video provided to the viewer terminal.

DETAILED DESCRIPTION OF THE INVENTION

Figure 1:
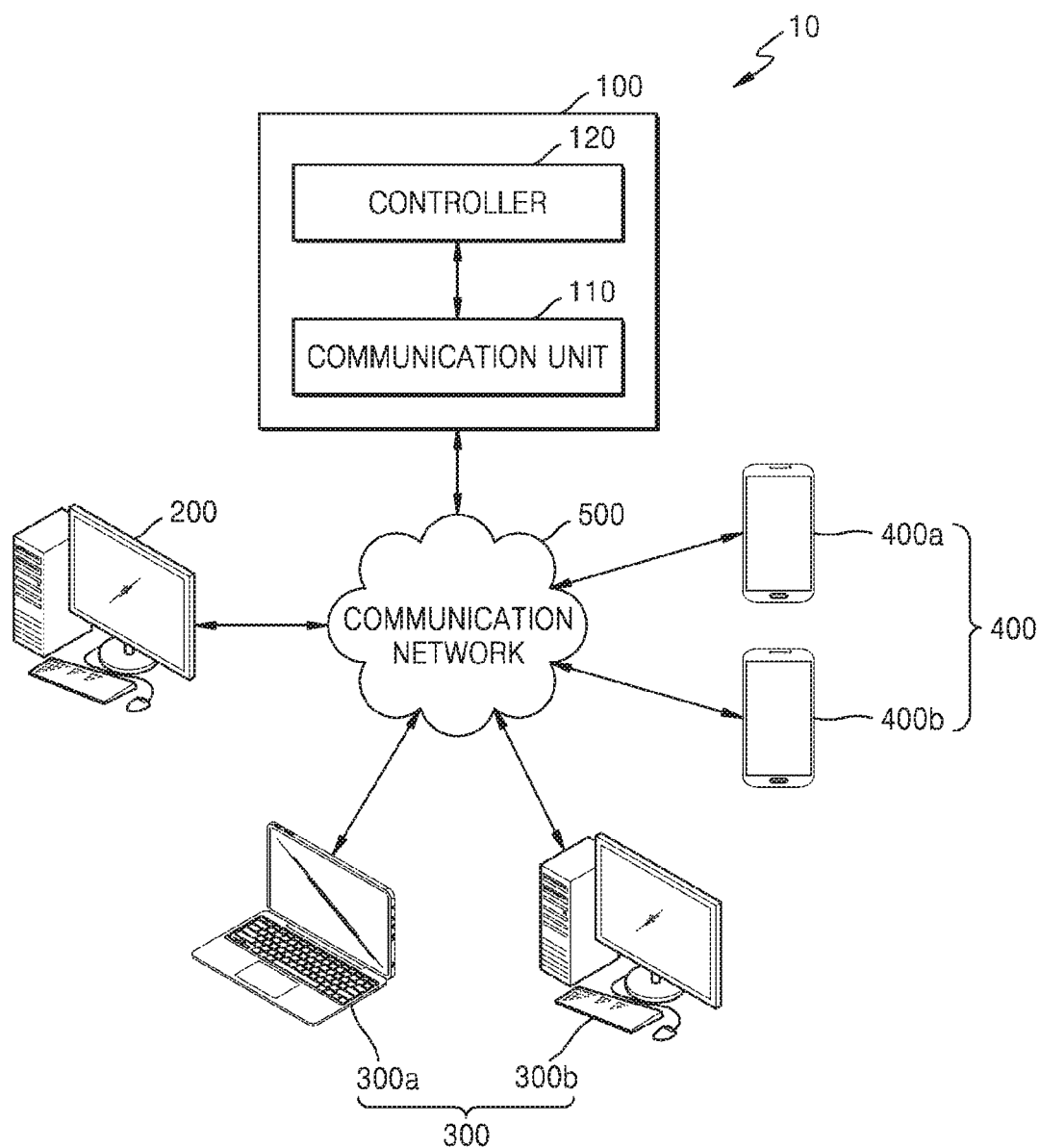
FIG. 1 is a diagram schematically illustrating a configuration of a video providing system according to an embodiment of the present disclosure.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

In drawings, like reference numerals refer to like elements throughout and overlapping descriptions shall not be repeated.

While such terms as "first", "second", etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that terms such as "including" or "having," etc., are intended to indicate the existence of features or components, and are not intended to preclude the possibility that one or more other features or components may exist or may be added.

In the drawings, for convenience of description, sizes of components may be exaggerated for clarity. For example, since sizes and thicknesses of components in drawings are arbitrarily shown for convenience of description, the sizes and thicknesses are not limited thereto.

A video in the present specification may include audiovisual information. In other words, the video may include information of sound (for example, voice) generated by a real person, a virtual character, a surrounding object, or a background appearing in the video. Examples of the video may include a movie, news, a drama series, and an animation, and may also include various types of personal broadcasts provided through a communication network, such as the Internet. In the present specification, the video may include a still image displayed throughout a certain period of time.

Also, subtitles in the present specification may be symbols indicating, in visual forms, various audiovisual types of information expressed in a video. For example, various types of information expressed in a video may include sound generated by a real person, a virtual character, a surrounding object, or a background appearing in the video, and may also include information of movement, a shape, a color, a smell, or narration. The subtitles may be visual symbols including characters, punctuation marks, figures, drawings, or photographs indicating such information. In addition, despite the name, the subtitles in the present specification may be sound indicating, in an auditory form, various audiovisual types of information expressed in a video. For example, when a character or narrator appearing in a video speaks lines in a first language, voice in which the lines are translated into a second language may be the subtitles. Here, the voice in the second language may be voice of an ordinary citizen performing translation or voice generated by a voice generating program.

FIG. 1 is a diagram schematically illustrating a configuration of a video providing system according to an embodiment of the present disclosure.

Referring to FIG. 1, a video providing system 10 according to an embodiment includes a video providing apparatus 100. Also, the video providing system 10 further includes a video supplier terminal 200, a subtitler terminal 300, a viewer terminal 400, and a communication network 500.

The video providing system 10 according to an embodiment of the present disclosure provides a video supplied from the video supplier terminal 200 to the viewer terminal 400. Also, subtitles generated from the subtitler terminal 300 are provided to the viewer terminal 400.

The video providing apparatus 100 is an apparatus for performing a video providing service of the video providing system 10. In other words, the video providing apparatus 100 may receive a video signal including information of a video supplied from the video supplier terminal 200. Also, the video providing apparatus 100 may provide the video signal to the subtitler terminal 300 so as to provide, to a user of the subtitler terminal 300, an opportunity to input subtitles with respect to the video. Also, the video providing apparatus 100 may receive a subtitle signal including information of the subtitles from the subtitler terminal 300. The video providing apparatus 100 may provide, to the viewer terminal 400, various signals enabling the viewer terminal 400 to reproduce the video and the subtitles with respect to the video. The video providing apparatus 100 may be a server in which data (for example, the video and the subtitles) for performing the video providing service is stored. Here, the video providing apparatus 100 may include a plurality of servers based on traffic or an amount of data.

The video providing apparatus 100 may be a server that provides not only the video providing service, but also a general search service and other various services enhancing user convenience. In other words, the video providing apparatus 100 may provide, in addition to the video providing service, various services, such as a search service, an email service, a blog service, a social network service, a news service, and shopping information providing service.

Alternatively, the video providing apparatus 100 may be a server providing, to a terminal requesting the portal service to provide information, a web page provided by the portal service, by being connected to a server providing the portal service, such as a search service, an email service, a news service, or a shopping service. Here, the video providing apparatus 100 and the server providing the portal service may be separate servers physically separated from each other or may be one server only conceptually separated.

The video providing apparatus 100 includes a communication unit 110 and a controller 120.

The communication unit 110 may receive a signal related to a video desired to be supplied by the video supplier terminal 200. Also, the communication unit 110 may provide the signal related to the video to the subtitler terminal 300, or receive a subtitle signal with respect to the video from the subtitler terminal 300. Also, the communication unit 110 may provide the signal related to the video and the subtitle signal to the viewer terminal 400.

Such a communication unit 110 may be a Bluetooth communication unit, a Bluetooth low energy (BLE) communication unit, a near field communication unit, a wireless local area network (WLAN) (Wi-Fi) communication unit, a Zigbee communication unit, an infrared data association (IrDA) communication unit, a Wi-Fi direct (WFD) communication unit, an ultra wideband (UWB) communication unit, or an Ant+ communication unit, but is not limited thereto.

The controller 120 generally controls the overall operations of the video providing apparatus 100. For example, the controller 120 may allow or prohibit signal transmission and reception of the communication unit 110 by controlling signal transmission and reception operations of the communication unit 110.

The controller 120 may include any type of apparatus capable of processing data, such as a processor. Here, the 'processor' may denote, for example, a data processing apparatus embedded in hardware and having a physically structured circuit to perform a function expressed in a code or command included in a program. Examples of the data processing apparatus embedded in hardware may include a microprocessor, a central processing unit (CPU), a processor core, a multiprocessor, an application specific integrated circuit (ASIC), and a field programmable gate array (FPGA), but are not limited thereto.

Figure 2:
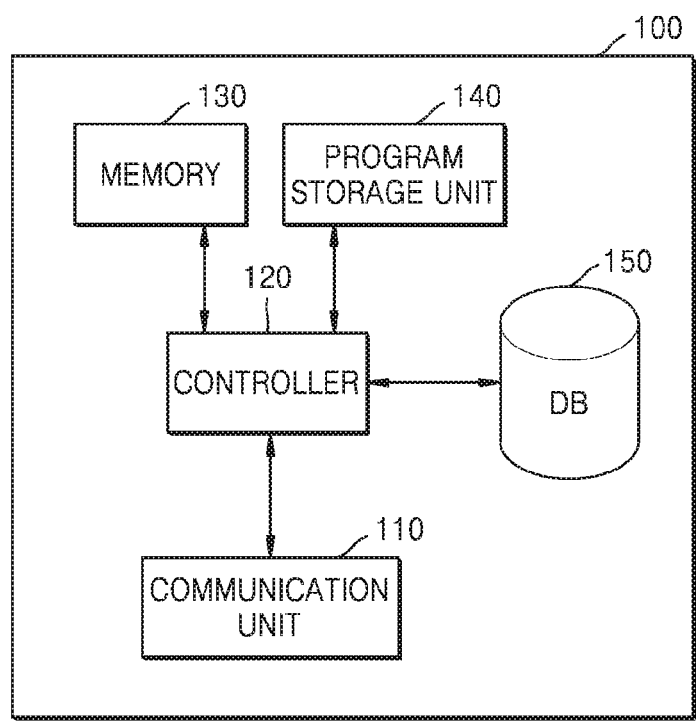
FIG. 2 is a block diagram schematically illustrating an example of an internal configuration of a video providing apparatus of FIG. 1.

Referring to FIG. 2, the video providing apparatus 100 may further include, in addition to the communication unit 110 and the controller 120, a memory 130, a program storage unit 140, and a database (DB) 150.

The memory 130 may temporarily or permanently store data processed by the controller 120. Here, the memory 130 may include a magnetic storage medium or a flash storage medium, but the range of the present disclosure is not limited thereto.

The program storage unit 140 may be a component including software for performing various essential or auxiliary operations so as to perform the video providing service.

The DB 150 may store data received from the video supplier terminal 200, the subtitler terminal 300, the viewer terminal 400, or another electronic apparatus. The communication unit 110 may receive a signal including information of particular data from the video supplier terminal 200, the subtitler terminal 300, or the viewer terminal 400, and the DB 150 may store the data. Also, the communication unit 110 may receive a request signal requesting particular data from the video supplier terminal 200, the subtitler terminal 300, or the viewer terminal 400, and the controller 120 may select data corresponding to the request signal from data stored in the DB 150. The communication unit 110 may provide the selected data to an electronic apparatus that transmitted the request signal.

Referring back to FIG. 1, the video supplier terminal 200 may be an apparatus supplying the video in the video providing system 10. Here, the video supplied by the video supplier terminal 200 may be a video directly manufactured by the video supplier terminal 200 or a video received by the video supplier terminal 200 from an external source. The video signal including information of the video supplied by the video supplier terminal 200 may be transmitted to the video providing apparatus 100 through the communication network 500.

The subtitler terminal 300 may generate the subtitles with respect to the video supplied by the video supplier terminal 200. Here, the subtitles generated by the subtitler terminal 300 may be subtitles input by a user of the subtitler terminal 300. Alternatively, the subtitles generated by the subtitler terminal 300 may be subtitles automatically generated by an automatic translation computer program or a voice recognition computer program inside or outside the subtitler terminal 300. A plurality of the subtitler terminal 300 may be included in one video providing system 10. In other words, one video providing system 10 may include a first subtitler terminal 300a and a second subtitler terminal 300b, and each of the subtitler terminals 300 may generate subtitles with respect to one video.

The viewer terminal 400 may be an apparatus displaying the video supplied by the video supplier terminal 200 and the subtitles generated by the subtitler terminal 300. In other words, the viewer terminal 400 may receive the video signal including the information of the video and the subtitle signal including the information of the subtitles, and may provide the video and the subtitles to a user of the viewer terminal 400 by using the signals. A plurality of the viewer terminals 400 may be included in one video providing system 10. In other words, one video providing system 10 may include a first viewer terminal 400a and a second viewer terminal 400b, and the viewer terminals 400 may reproduce the same or different videos, and may reproduce the same or different subtitles with respect to the same video.

Here, the subtitles displayed in the viewer terminal 400 may be characters prepared in visual symbols, or as described above, may be sound expressed in an auditory form. In other words, when the subtitle signal including voice information is generated by the subtitler terminal 300, the viewer terminal 400 may receive the signal from the video providing apparatus 100 and output corresponding voice through a sound unit of the viewer terminal 400. Here, the sound expressed in the auditory form may be voice dubbed by the user of the subtitler terminal 300.

An electronic apparatus capable of transmitting and receiving data to and from another apparatus in a wired/wireless communication environment may be unlimitedly employed as the video supplier terminal 200, the subtitler terminal 300, or the viewer terminal 400. In detail, each of the video supplier terminal 200, the subtitler terminal 300, and the viewer terminal 40 may be a desktop computer, a notebook personal computer (PC), a tablet PC, a smart phone, a smart television (TV), a mobile phone, a personal digital assistant (PDA), a laptop computer, a media player, a micro-server, a global positioning system (GPS) apparatus, an electronic book terminal, a digital broadcasting terminal, a navigation device, a kiosk, an MP3 player, a digital camera, a wearable device, or another mobile or non-mobile computing apparatus, but is not limited thereto. Also, each of the video supplier terminal 200, the subtitler terminal 300, and the viewer terminal 400 may include various apparatuses capable of receiving a touch input, such as an electronic blackboard and a touch table, and may be an accessory, such as a watch, glasses, a hair band, or a ring, having a communication function or a data processing function, but is not limited thereto.

The communication network 500 may electrically connect the video providing apparatus 100 to each of the video supplier terminal 200, the subtitler terminal 300, and the viewer terminal 400. In other words, the communication network 500 may denote a connection path between electronic apparatuses capable of transmitting and receiving data to and from another apparatus in a wired/wireless communication environment. Examples of the communication network 500 may include wired networks, such as a local area network (LAN), a wide area network (WAN), a metropolitan area network (MAN), and an integrated service digital network (ISDN), and wireless networks, such as wireless LAN, a code division multiple access (CDMA), Bluetooth, and a satellite communication network, but are not limited thereto.

Figure 3:
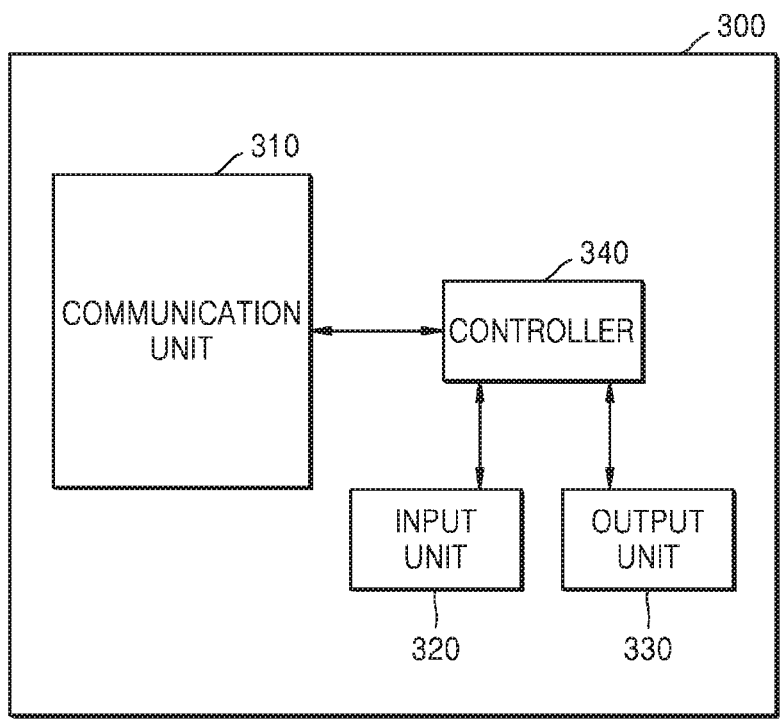
FIGS. 3 and 4 are block diagrams schematically illustrating examples of an internal configuration of a subtitler terminal, according to an embodiment of the present disclosure.
Figure 4:
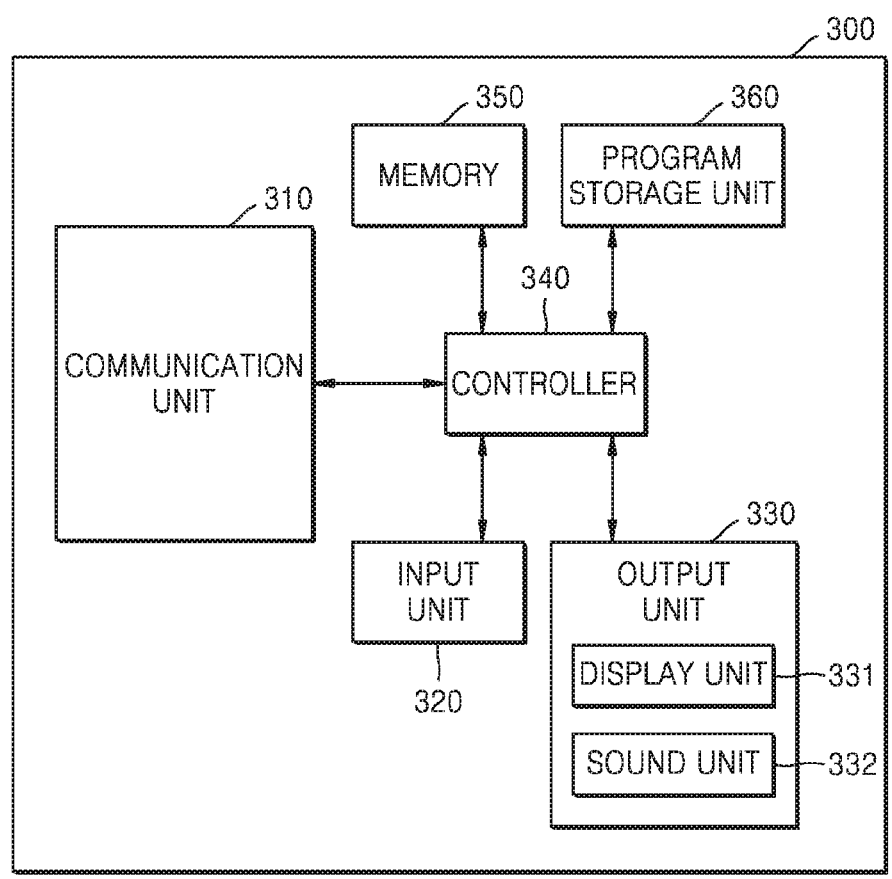

FIGS. 3 and 4 are block diagrams schematically illustrating examples of an internal configuration of a subtitler terminal, according to an embodiment of the present disclosure.

Referring to FIG. 3, the subtitler terminal 300 according to an embodiment of the present disclosure includes a communication unit 310, an input unit 320, an output unit 330, and a controller 340.

The communication unit 310 may receive the signal related to a video from the video providing apparatus 100. Also, the communication unit 310 may provide a subtitle signal including the information of the subtitles to the video providing apparatus 100.

The communication unit 310 may be a Bluetooth communication unit, a BLE communication unit, a near field communication unit, a WLAN communication unit, a Zigbee communication unit, an IrDA communication unit, a WFD communication unit, an UWB communication unit, or an Ant+ communication unit, but is not limited thereto.

The input unit 320 may receive various requests from the user of the subtitler terminal 300. For example, the input unit 320 may receive a request for receiving a video from the user of the subtitler terminal 300, a request for reproducing the received video, and a request for transmitting a subtitle signal. Also, the input unit 320 may receive the subtitle information input by the user of the subtitler terminal 300. The input unit 320 may receive a voice input of the user, a character input of the user, an input of the user pressing a button, or a touch input of the user, but the range of the present disclosure is not limited thereto.

The output unit 330 may output a signal for transmitting information to the user of the subtitler terminal 300 in various forms. For example, the output unit 330 may audio-visually output image information and information about sound of the received video.

Referring to FIG. 4, the output unit 330 may include a display unit 331 and a sound unit 332. Also, the subtitler terminal 300 may further include, in addition to the communication unit 310, the input unit 320, the output unit 330, and the controller 340, a memory 350 and a program storage unit 360.

The display unit 331 may display information intended to be displayed visually from among information included in the video signal. For example, the display unit 331 may output image information included in the video signal to at least a partial region of the display unit 331.

The display unit 331 may include at least one of a liquid crystal display, a thin film transistor-liquid crystal display, an organic light-emitting diode, a 3-dimensional (3D) display, and an electrophoretic display, but is not limited thereto. According to an embodiment of the subtitler terminal 300, the subtitler terminal 300 may include two or more display units 331.

The sound unit 332 may output information intended to be transmitted in an auditory form from among information included in the video signal. For example, the sound unit 332 may output information about sound included in the video signal. The sound unit 332 may output sound having different lengths, frequencies, volumes, pitches, or tones based on a type of notification.

The sound unit 332 may include at least one of a tuner, an equalizer, a headphone, an earphone, and various types of speakers, but is not limited thereto. In other words, the sound unit 332 may be any type of apparatus capable of generating sound via electrical or mechanical method.

The memory 350 may perform a function of temporarily or permanently storing data processed by the controller 340. Here, the memory 350 may include a magnetic storage medium or a flash storage medium, but the range of the present disclosure is not limited thereto. The program storage unit 360 may be a component including software for performing various essential or auxiliary operations so as to perform the video providing service.

FIGS. 5 through 21 are flowcharts schematically illustrating examples of a video providing method according to embodiments of the present disclosure. Hereinafter, the video providing method using the video providing apparatus 100 described above will be described with reference to FIGS. 5 through 19, and a method of providing subtitles of a video using the subtitler terminal 300 described above will be described with reference to FIGS. 20 and 21.

Figure 5:
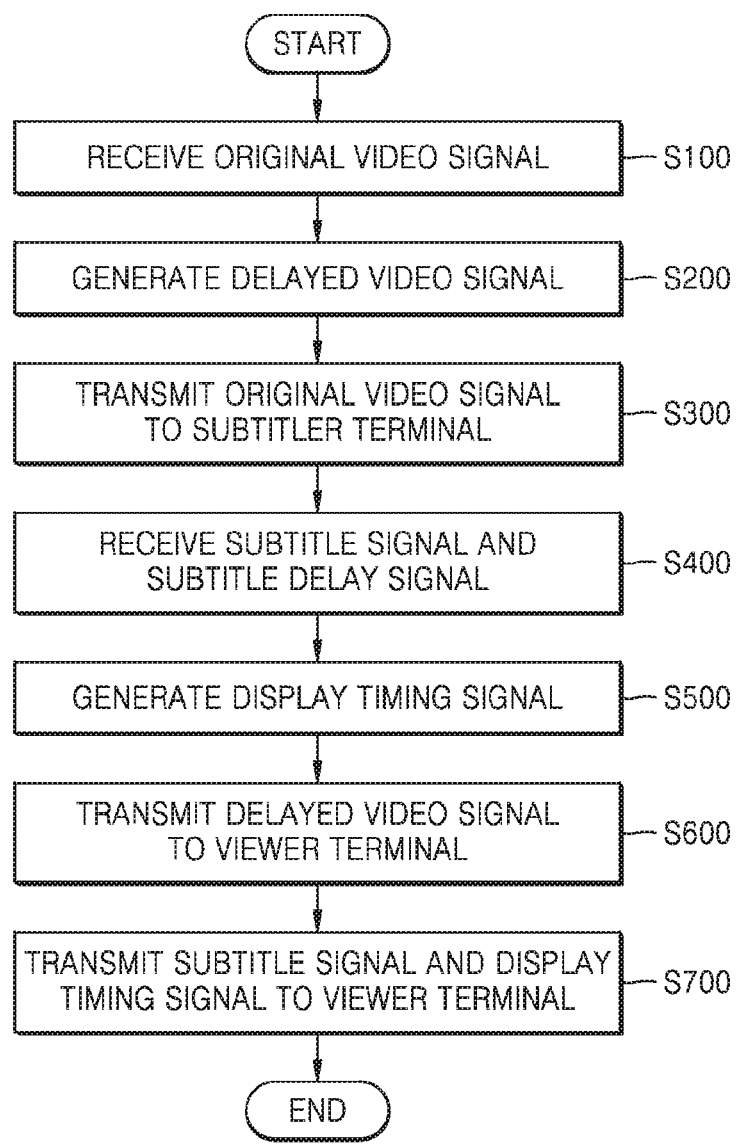
FIGS. 5 through 21 are flowcharts schematically illustrating examples of a video providing method according to various embodiments of the present disclosure.

First, referring to FIG. 5, the video providing apparatus 100 may receive an original video signal in operation S100. Here, the original video signal may include information about an original video and the content of the original video. In other words, the original video signal may be a signal including various types of information required to reproduce the original video. The various types of information may include, for example, image information about at least some frames from among all frames of the video, sound information about sound output while the video is reproduced, and information about a video codec. The video providing apparatus 100 may receive the original video signal from the video supplier terminal 200. The reception of the original video signal is performed by the communication unit 110 of the video providing apparatus 100.

Then, the video providing apparatus 100 generates a delayed video signal in operation S200. The delayed video signal may include information about a delayed video. Here, the delayed video may be a video in which the transmission of the original video to the viewer terminal 400 is delayed by a first time period. The delayed video signal may be a signal newly generated separately from the original video signal or may be a signal provided after the first time period after simply temporarily storing the original video signal. In other words, the video providing apparatus 100 generating the delayed video signal may mean that a signal including information of a new video is generated by generating the new video in which a reproduction time of the new video is delayed by the first time period from the receipt of the original video signal, or may mean a delay operation in an operation of simply storing, for the first time period, and delaying the transmission of the original video signal to the viewer terminal 400.

Here, the first time period may be a time arbitrarily set by a manager of the video providing apparatus 100 or the user of the video supplier terminal 200. The first time period may be a spare or additional time for the video providing apparatus 100 to provide, to the viewer terminal 400, a video together with subtitles. In detail, the first time period may be a spare or additional time spent by the video providing apparatus 100 to transmit the original video signal to the subtitler terminal 300, the time spent by the subtitler terminal 300 to generate the subtitles, and the time spent by the video providing apparatus 100 to receive a subtitle signal from the subtitler terminal 300. The first time period may be set in terms of seconds, minutes, or hours, to allow the video providing apparatus 100 to take the necessary steps to provide the video with subtitles to the viewer terminal 400. The delayed video signal may be generated by the controller 120 of the video providing apparatus 100.

Also, the video providing apparatus 100 may transmit the original video signal to the subtitler terminal 300 in operation S300. Here, the video providing apparatus 100 may transmit the original video signal received from the video supplier terminal 200 as it is or after a time shorter than the first time period. Alternatively, the video providing apparatus 100 may extract the original video from the original video signal received from the video supplier terminal 200, and newly generate and transmit a signal including the extracted information. In other words, resolution, frame per second, and codec of the video according to the original video signal received from the video supplier terminal 200 may be different from or same as resolution, frame per second, and codec of the video according to the original video signal transmitted to the subtitler terminal 300. The original video signal may be transmitted by the communication unit 110 of the video providing apparatus 100.

Then, the video providing apparatus 100 may receive the subtitle signal and a subtitle delay signal from the subtitler terminal 300 in operation S400. The subtitle signal may be a signal including information of subtitles generated by the subtitler terminal 300, and the subtitles may be subtitles related content of the original video. The subtitle delay signal may be a signal including information for delaying a display of the subtitles. In detail, the user of the subtitler terminal 300 may personally prepare subtitles with respect to partial content of the video while personally watching the original video. Here, it may take some time for the user of the subtitler terminal 300 to watch the partial content of the video and prepare the subtitles with respect to the partial content. For example, when the user hears Korean of ' '안녕하세요' ' and prepares English subtitles of 'hello', a time for listening ' '안녕하세요' ', a time for thinking how to translate ' 안녕하세요 ' to English, and a time for typing 'hello' may be consumed. As a result, when the video providing apparatus 100 displays the subtitles on the video based on a point of time when the subtitle signal is received, an image and the subtitles may not synchronize. The subtitle delay signal may include information about delayed times generated by the user of the subtitler terminal 300. The subtitle signal and the subtitle delay signal may be received by the communication unit 110 of the video providing apparatus 100. A detailed example of information included in the subtitle delay signal will be described with reference to FIGS. 6 and 7.

Then, the video providing apparatus 100 may generate a display timing signal in operation S500. The video providing apparatus 100 may generate the display timing signal based on the subtitle delay signal, and such a display timing signal may be a signal indicating a timing when the subtitles are to be displayed on the delayed video. In detail, as described above, the subtitle delay signal may be a signal including information about the delayed times generated by the user of the subtitler terminal 300, and the video providing apparatus 100 may determine a timing when the subtitles are to be actually displayed by using the information. The display timing signal may be generated by the controller 120 of the video providing apparatus 100. A detailed example of generating the display timing signal will be described with reference to FIGS. 6 through 8.

Meanwhile, the video providing apparatus 100 may transmit the delayed video signal to the viewer terminal 400 in operation S600. The delayed video signal is transmitted by the communication unit 110 of the video providing apparatus 100.

Also, the video providing apparatus 100 may transmit the subtitle signal and the display timing signal to the viewer terminal 400 in operation S700. The subtitle signal and the display timing signal are transmitted by the communication unit 110 of the video providing apparatus 100.

In operations S600 and S700, the video providing apparatus 100 may enable the viewer terminal 400 to reproduce the video while displaying the subtitles corresponding to the video. Here, the video providing apparatus 100 may also provide the display timing signal indicating when the subtitles are to be displayed in the video such that the viewer terminal 400 may display the subtitles at a timing intended by the video providing apparatus 100.

In FIG. 5, operation S300 is performed after operation S200, but the present disclosure is not limited thereto, and operation S300 may be performed before operation S200 or may be performed at the same time as operation S200. Also, an order of performing operations S600 and S700 may be changed or operations S600 and S700 may be performed simultaneously.

Figure 6:
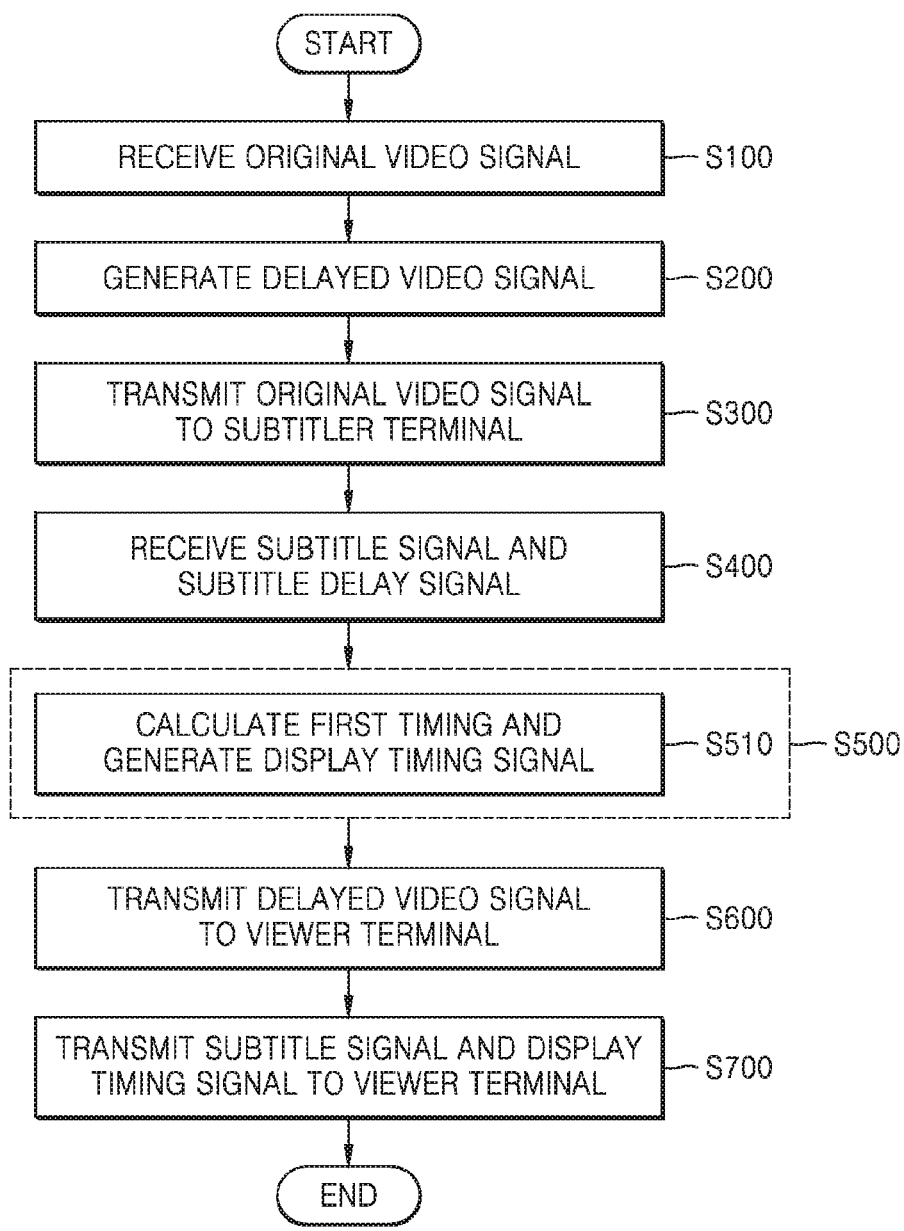

Selectively, according to an embodiment of FIG. 6, operation S500 of the video providing method may include calculating a first timing and generating the display timing signal (operation S510). In detail, the subtitle delay signal received from the subtitler terminal 300 may be signal including information of a second time period. The second time period is a time assigned by the user of the subtitler terminal 300, and may indicate a delayed time consumed while the user generates subtitles of content personally viewed. In this case, the video providing apparatus 100 may calculate the first timing in which a time obtained by subtracting the second time period from the first time period is delayed from a timing when the subtitler terminal 300 transmitted the subtitle signal or a timing when the video providing apparatus 100 received the subtitle signal transmitted by the subtitler terminal 300.

Hereinafter, processes of calculating the first timing will be described in an order of logical operations. First, the video providing apparatus 100 may delay the first time period from a timing when the subtitle signal is completed. Such an operation may be performed to compensate for the time difference of the video between the subtitler terminal 300 and the viewer terminal 400 since the video provided by the video providing apparatus 100 to the viewer terminal 400 is delayed by the first time period. Then, the video providing apparatus 100 may calculate the time advanced by the second time period. Such an operation may be performed to compensate for the time difference caused by the delayed time generated while the user of the subtitler terminal 300 generates the subtitles.

In operation S510, the video providing apparatus 100 may calculate the first timing, i.e., a subtitle display timing for synchronizing the delayed video and the subtitles, and generate the display timing signal indicating the first timing.

Figure 7:
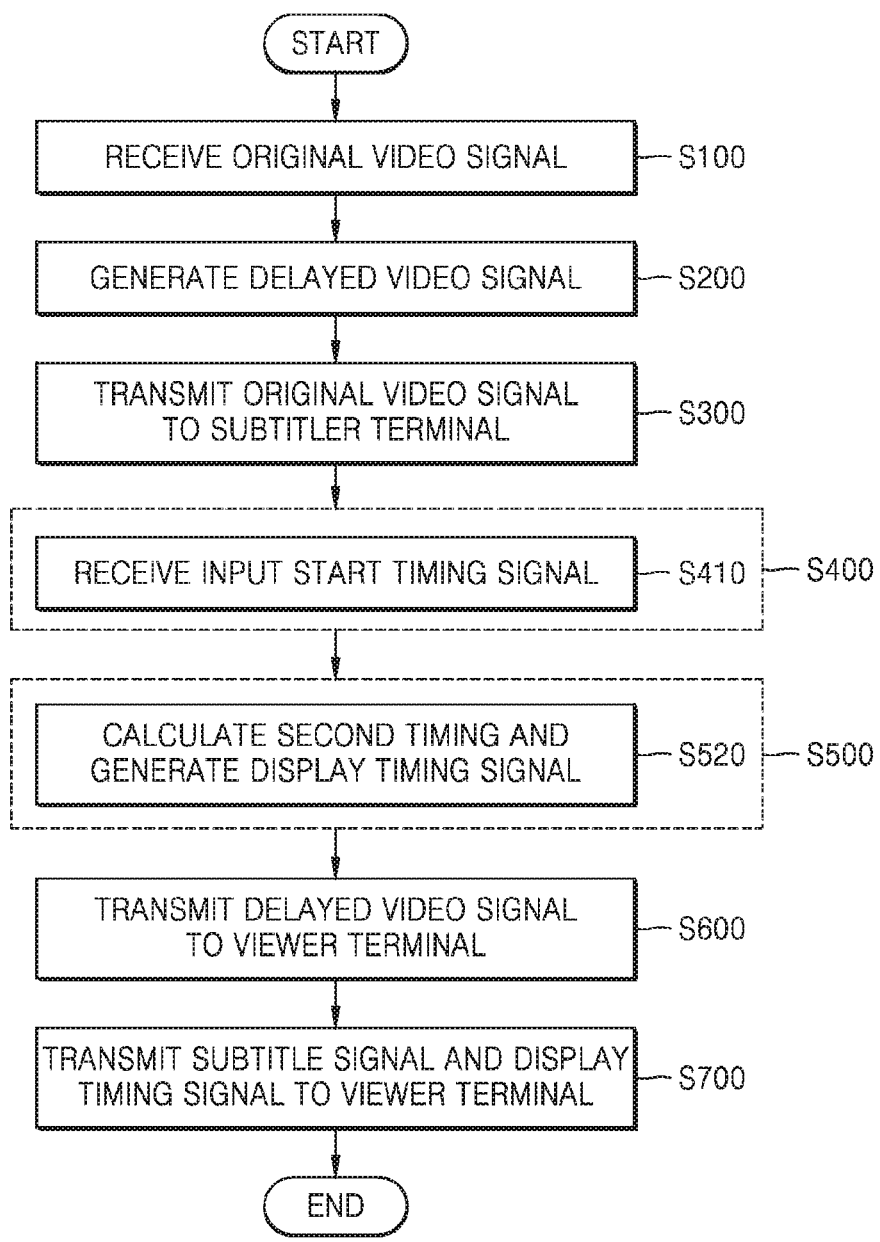

Selectively, according to an embodiment of FIG. 7, operation S400 of the video providing method may include receiving an input start timing signal (operation S410), and operation S500 may include calculating a second timing and generating the display timing signal (operation S520). In detail, the subtitle delay signal received from the subtitler terminal 300 may be a signal including information of the second time period. Also, the subtitler terminal 300 may transmit, to the video providing apparatus 100, the input start timing signal including information that the subtitles are started to be input, when the user of the subtitler terminal 300 starts to input the subtitles in the subtitler terminal 300. At this time, the second time period is a time personally assigned by the user of the subtitler terminal 300, and may indicate a delayed time consumed by the user from when the user starts to watch a certain portion of the video to when the user starts to input the subtitles in the subtitler terminal 300. The second time period may be a delayed time consumed while the user generates subtitles of watched content. In this case, the video providing apparatus 100 may calculate the second timing in which the time obtained by subtracting the second time period from the first time period is delayed from a timing when the subtitler terminal 300 transmitted the subtitle signal or a timing when the video providing apparatus 100 received the subtitle signal transmitted by the subtitler terminal 300.

Hereinafter, processes of calculating the second timing will be described in an order of logical operations. First, the video providing apparatus 100 may delay the first time period from a timing when the subtitle signal is completed. Such an operation may be performed to compensate for a time difference of the video between the subtitler terminal 300 and the viewer terminal 400 since the video provided by the video providing apparatus 100 to the viewer terminal 400 is delayed by the first time period. Then, the video providing apparatus 100 may calculate a time advanced by the second time period. Such an operation may be performed to compensate for a time difference caused by the delayed time generated from when the user of the subtitler terminal 300 starts to watch the video to when the user of the subtitler terminal 300 starts to input the subtitles.

According to operations s410 and S520, the video providing apparatus 100 may calculate the second timing, i.e., a subtitle display timing for synchronizing the delayed video and the subtitles, and may generate the display timing signal indicating the second timing.

Figure 8:
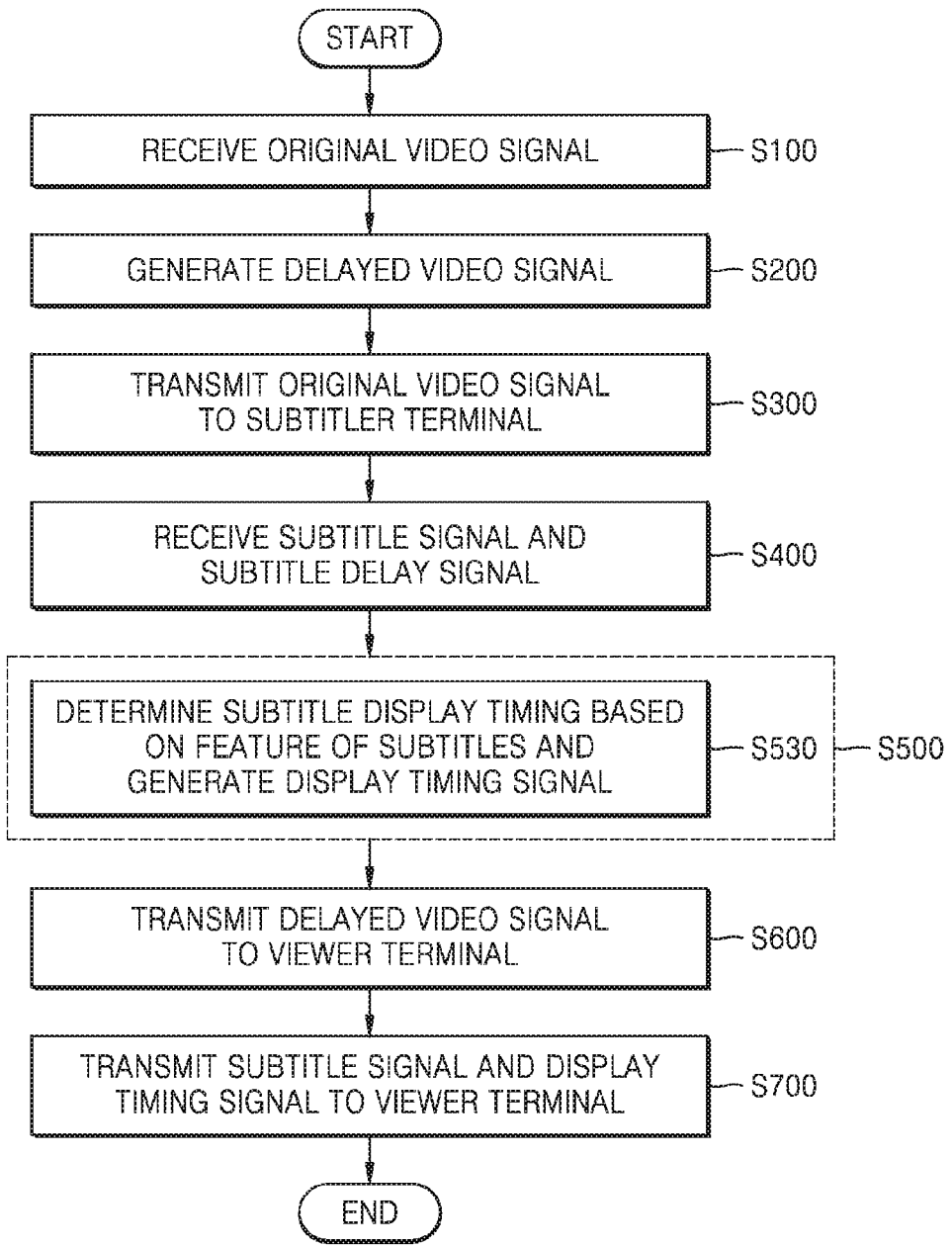

Selectively, according to an embodiment of FIG. 8, operation S500 of the video providing method may include determining a subtitle display timing based on a feature of the subtitles and generating the display timing signal (operation S530). Here, the feature of the subtitles may include the length of subtitles, the language of the subtitles, alphabet included in the subtitles, or a type of words. In other words, the video providing apparatus 100 may estimate an estimated time that may be consumed for the user of the subtitler terminal 300 to input the subtitles, based on the feature of the subtitles, such as the length of the subtitles. Then, the video providing apparatus 100 may calculate a timing in which a time obtained by subtracting the estimated time from the first time period is delayed from a timing when the subtitler terminal 300 transmits the subtitle signal, a timing when the video providing apparatus 100 received the subtitle signal transmitted from the subtitler terminal 300, or a timing when the subtitles are started to be input on the subtitler terminal 300.

According to operation S530, the video providing apparatus 100 may calculate the subtitle display timing for synchronizing the delayed video and the subtitles, and generate the display timing signal indicating the subtitle display timing.

Figure 9:
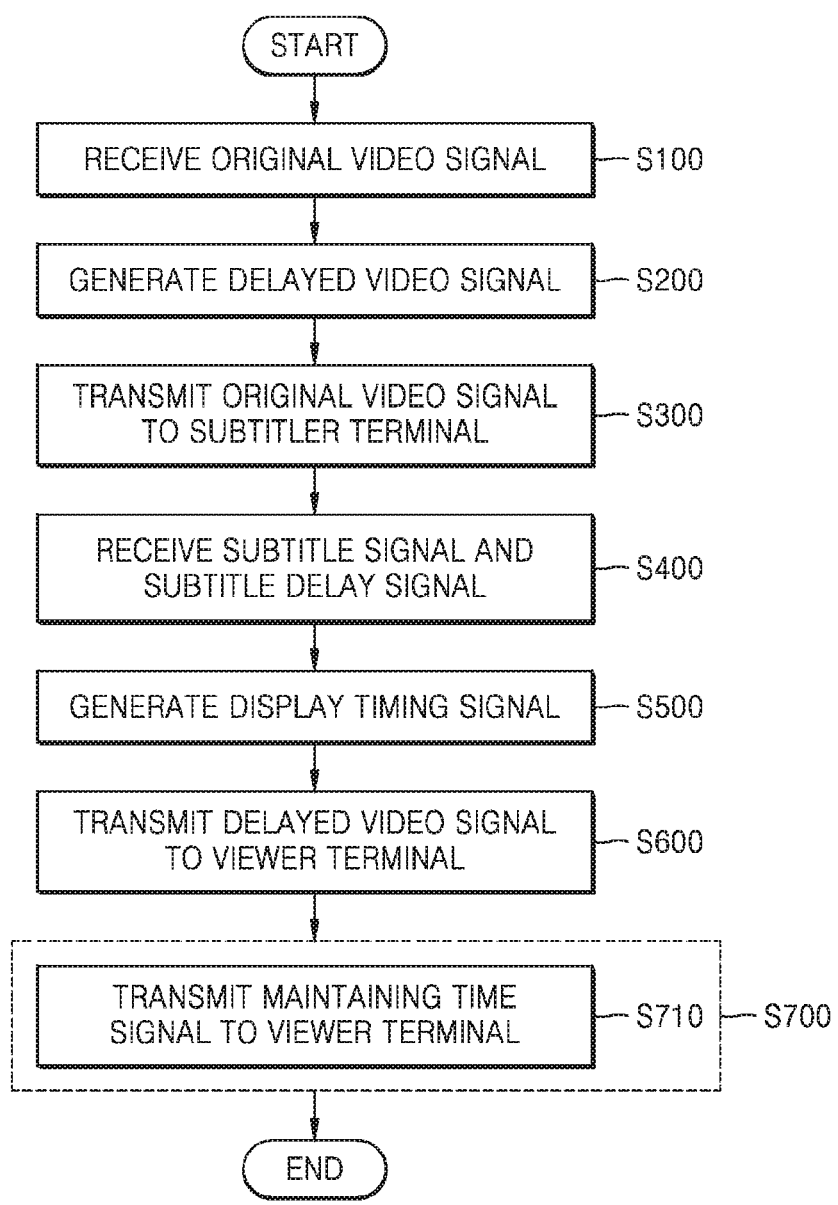
Figure 10:
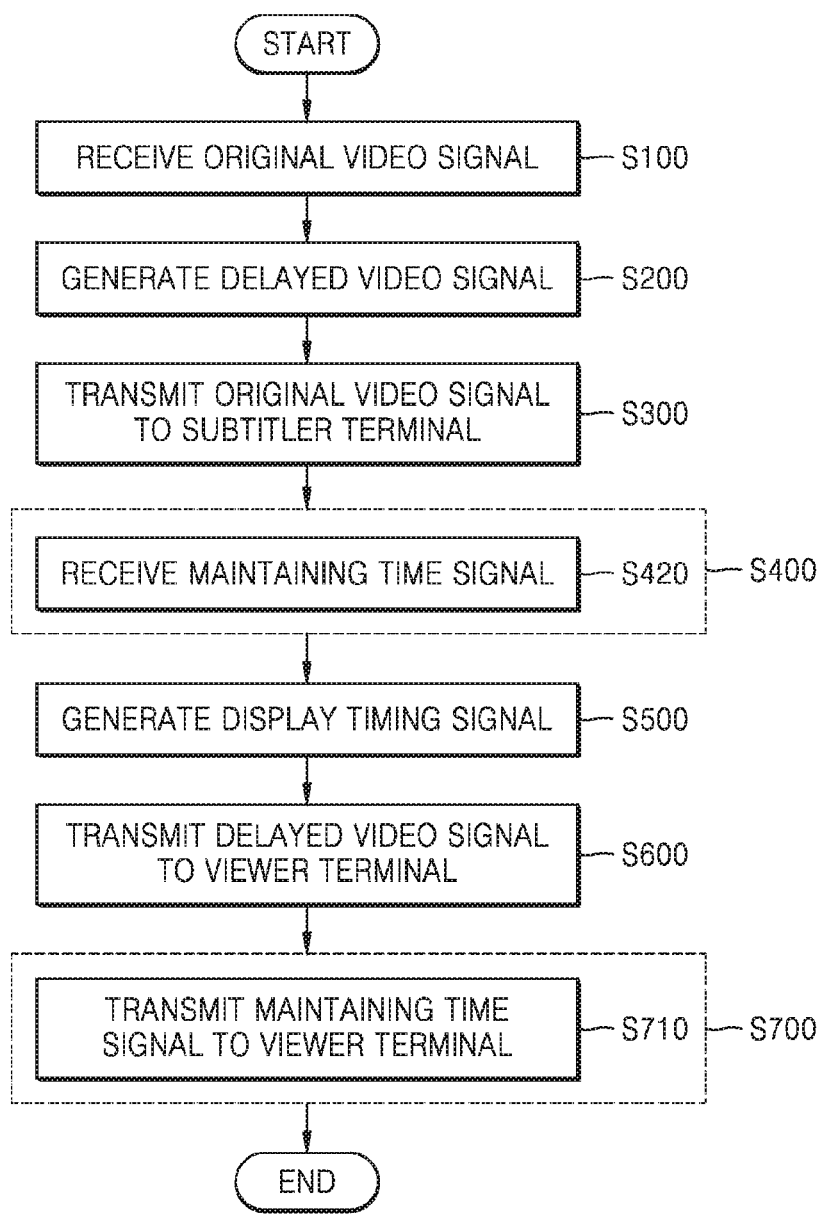
Figure 11:
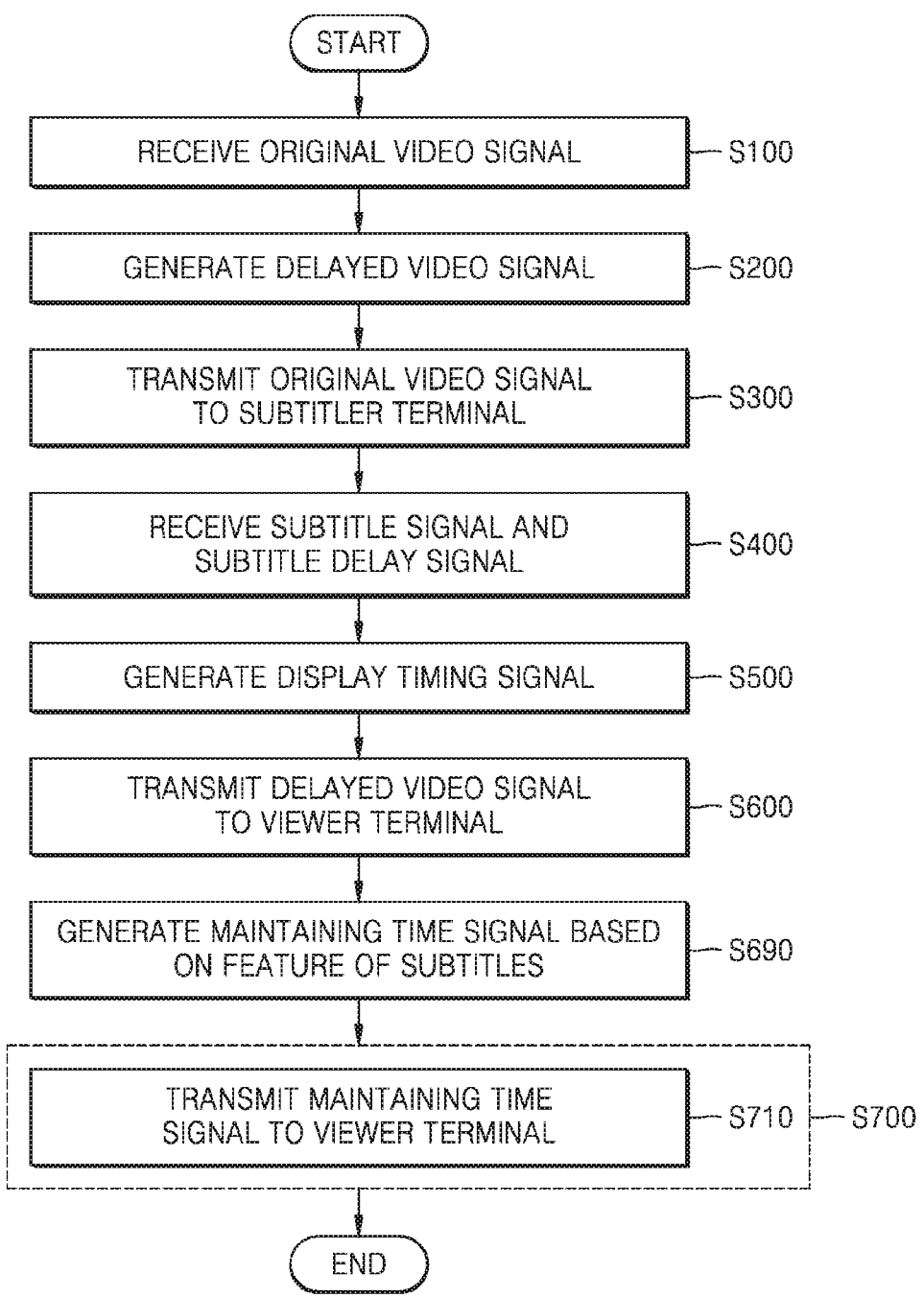

Selectively, according to an embodiment of FIG. 9, operation S700 of the video providing method may include transmitting a maintaining time signal to the viewer terminal 400 (operation S710). In detail, the maintaining time signal may be a signal including information of a delay maintaining time for maintaining the display of the subtitles. In other words, the video providing apparatus 100 may provide, to the viewer terminal 400, a signal indicating how long the subtitles provided to the viewer terminal 400 is to be displayed on the viewer terminal 400.

Here, the maintaining time signal may be a signal received by the video providing apparatus 100 from the subtitler terminal 300. In other words, according to an embodiment of FIG. 10, operation S400 of the video providing method may include receiving the maintaining time signal (operation S420). In other words, the user of the subtitler terminal 300 may self-determine how long the subtitles input by him/herself are to be displayed. For example, when the subtitles are relatively short, such as 'hello', the user of the subtitler terminal 300 may determine a subtitle maintaining time to be relatively short, and when the subtitles are relatively long, the user of the subtitler terminal 300 may determine the subtitle maintaining time to be relatively long. The video providing apparatus 100 may receive the maintaining time signal including information of the subtitle maintaining time, and transmit the signal to the viewer terminal 400, together with the subtitle signal.

Also, the maintaining time signal may be a signal directly generated by the video providing apparatus 100. In other words, according to an embodiment of FIG. 11, the video providing method may further include, before operation S700, generating the maintaining time signal based on the feature of the subtitles (operation S690). Here, the feature of the subtitles may include the length of the subtitles, the language of the subtitles, the alphabet included in the subtitles, and the type of words. In other words, the video providing apparatus 100 may predict a time to be consumed by the user of the viewer terminal 400 to read the subtitles while watching the video, based on the feature of the subtitles, such as the length of the subtitles. The video providing apparatus 100 may determine the subtitle maintaining time based on the predicted time, generate the maintaining time signal including information of the subtitle maintaining time, and transmit the maintaining time signal to the viewer terminal 400 together with the subtitle signal. The maintaining time signal may be generated by the controller 120 of the video providing apparatus 100.

According to operation S710, the video providing apparatus 100 may provide, to the viewer terminal 400, information about how long each subtitle is to be displayed on the video.

The viewer terminal 400 may display each subtitle on a display unit for the subtitle maintaining time according to the maintaining time signal. At this time, when a second subtitle needs to be displayed before a subtitle maintaining time of a first subtitle is passed, the viewer terminal 400 may delete the first subtitle early and display the second subtitle, move a location of the first subtitle and display the second subtitle, or display the second subtitle at a location that does not overlap the first subtitle.

Figure 12:
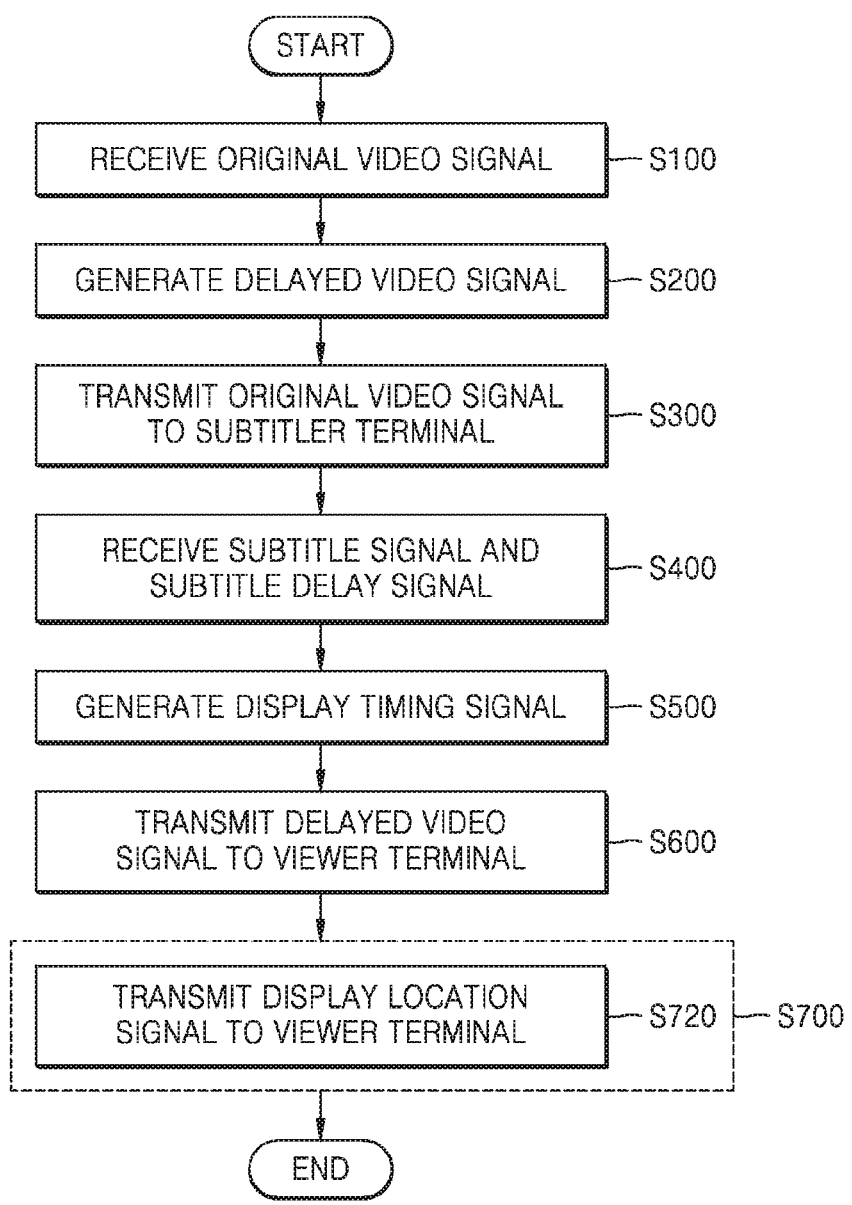
Figure 13:
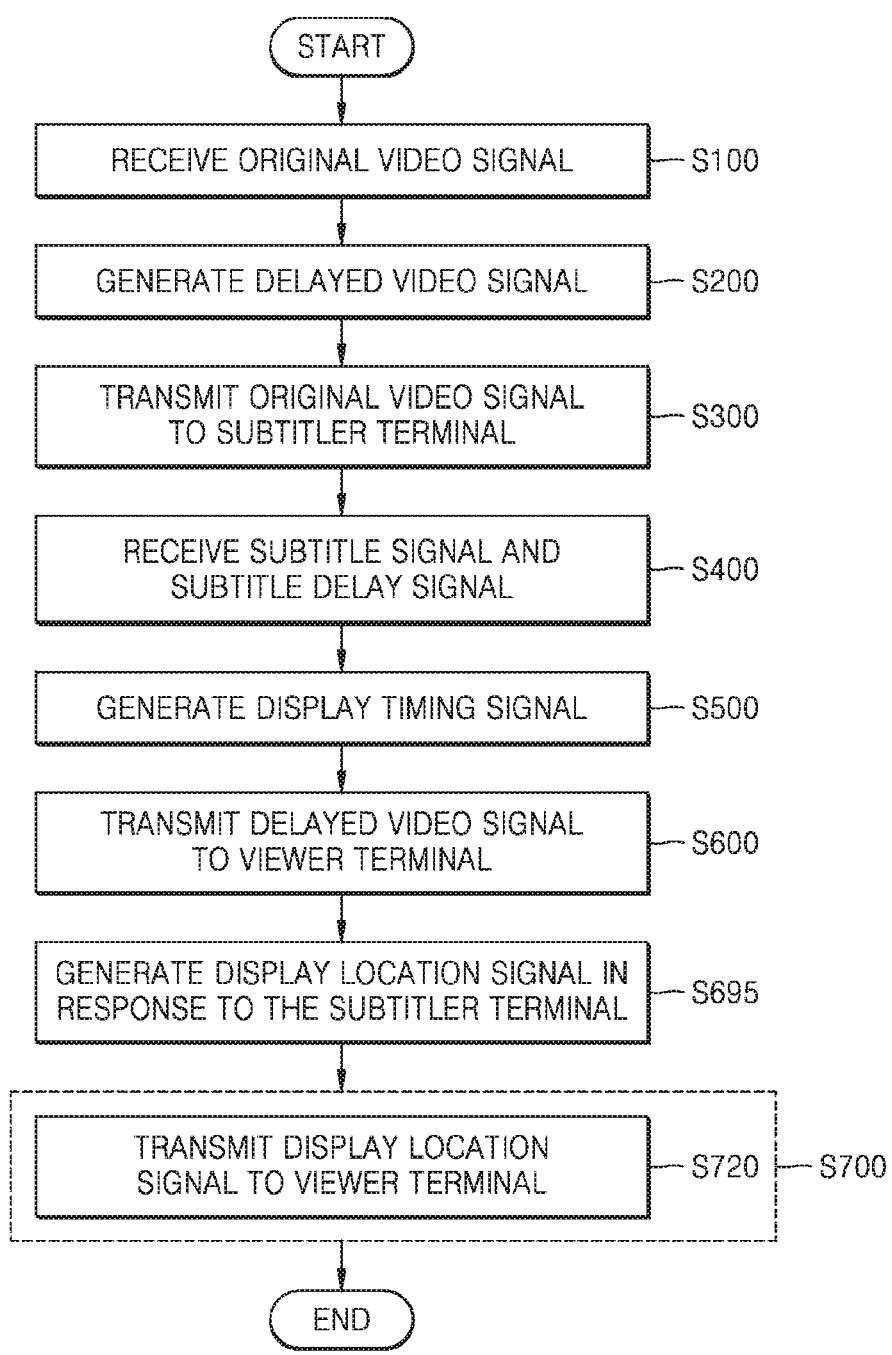
Figure 14:
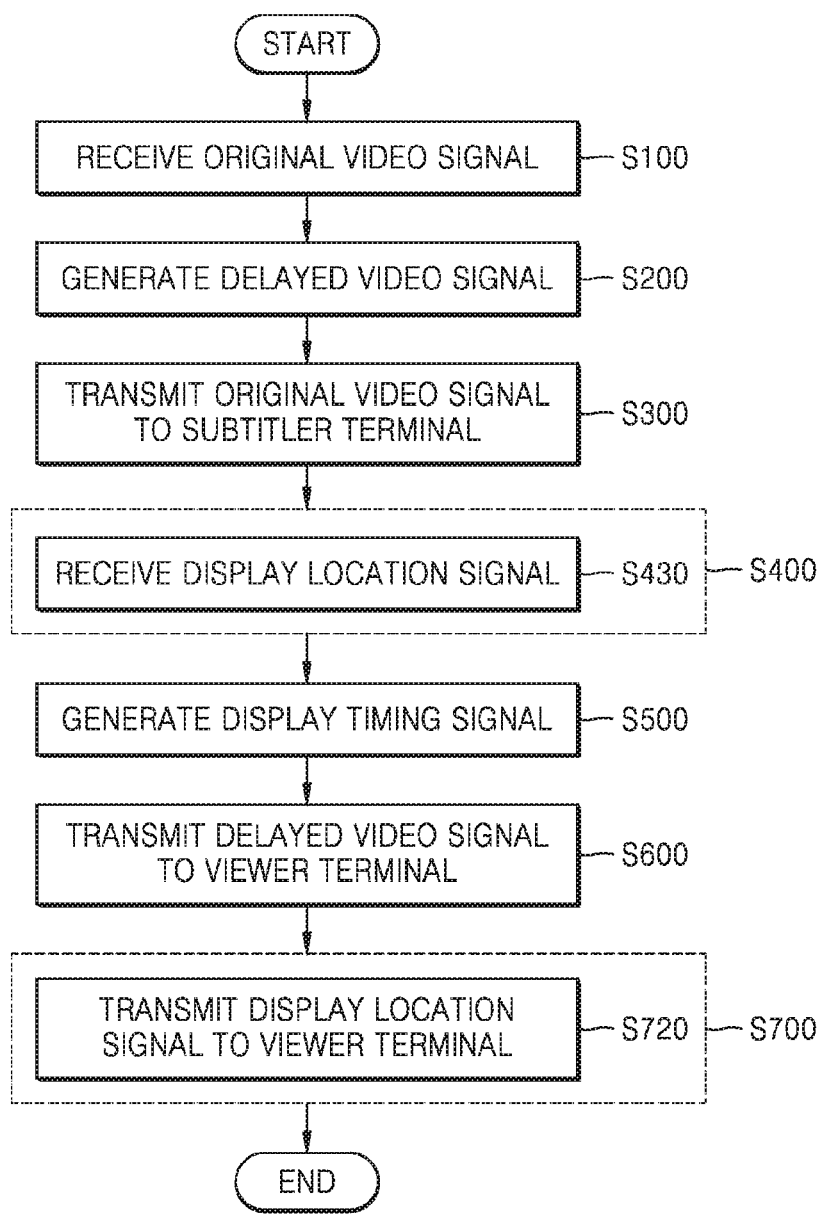

Selectively, according to an embodiment of FIG. 12, operation S700 of the video providing method may include transmitting a display location signal to the viewer terminal 400 (operation S720). In detail, the display location signal may be a signal including information about a location where the subtitles are to be displayed on the display unit of the viewer terminal 400 or on the video. For example, the display location signal may be a signal assigning a location such that the subtitles are displayed at a bottom portion of the display unit of the viewer terminal 400, or a signal assigning a location such that the subtitles are displayed in speech bubbles at particular locations of the video. In other words, the video providing apparatus 100 may provide, to the viewer terminal 400, the display location signal indicating whether the subtitles provided to the viewer terminal 400 are to be displayed on the viewer terminal 400.

Here, the display location signal may be a signal directly generated by the video providing apparatus 100. In other words, according to an embodiment of FIG. 13, the video providing method may further include, before operation S700, generating the display location signal in response to the subtitler terminal 300 (operation S695). Here, the video providing apparatus 100 may determine display locations of the subtitles based on a type of the subtitler terminal 300. For example, when the first subtitler terminal 300a and the second subtitler terminal 300b each transmit subtitles to the video providing apparatus 100, the video providing apparatus 100 may determine a display location of the subtitles received from the first subtitler terminal 300a to be a left portion of the display unit of the viewer terminal 400 and a display location of the subtitles received from the second subtitler terminal 300b to be a right portion of the display unit of the viewer terminal 400. The video providing apparatus 100 may generate the display location signal including information of the subtitle display location, and transmit the display location signal to the viewer terminal 400 together with the subtitle signal. The display location signal may be generated by the controller 120 of the video providing apparatus 100.

Also, the display location signal may be a signal received by the video providing apparatus 100 from the subtitler terminal 300. In other words, according to an embodiment of FIG. 14, operation S400 of the video providing method may include receiving the display location signal (operation S430). In other words, the user of the subtitler terminal 300 may determine by him/herself where the subtitles input by him/herself are to be displayed on the video. For example, when the subtitles are lines of a person sitting on the right side of a scene in the video, the subtitler terminal 300 may determine a display location of the subtitles to be the right side of the scene to indicate who is speaking the lines corresponding to the subtitles. The video providing apparatus 100 may receive the display location signal including the information of the subtitle display location, and transmit the display location signal to the viewer terminal 400 together with the subtitle signal.

According to operation S720, the video providing apparatus 100 may provide, to the viewer terminal 400, information about where each subtitle is to be displayed.

Figure 15:
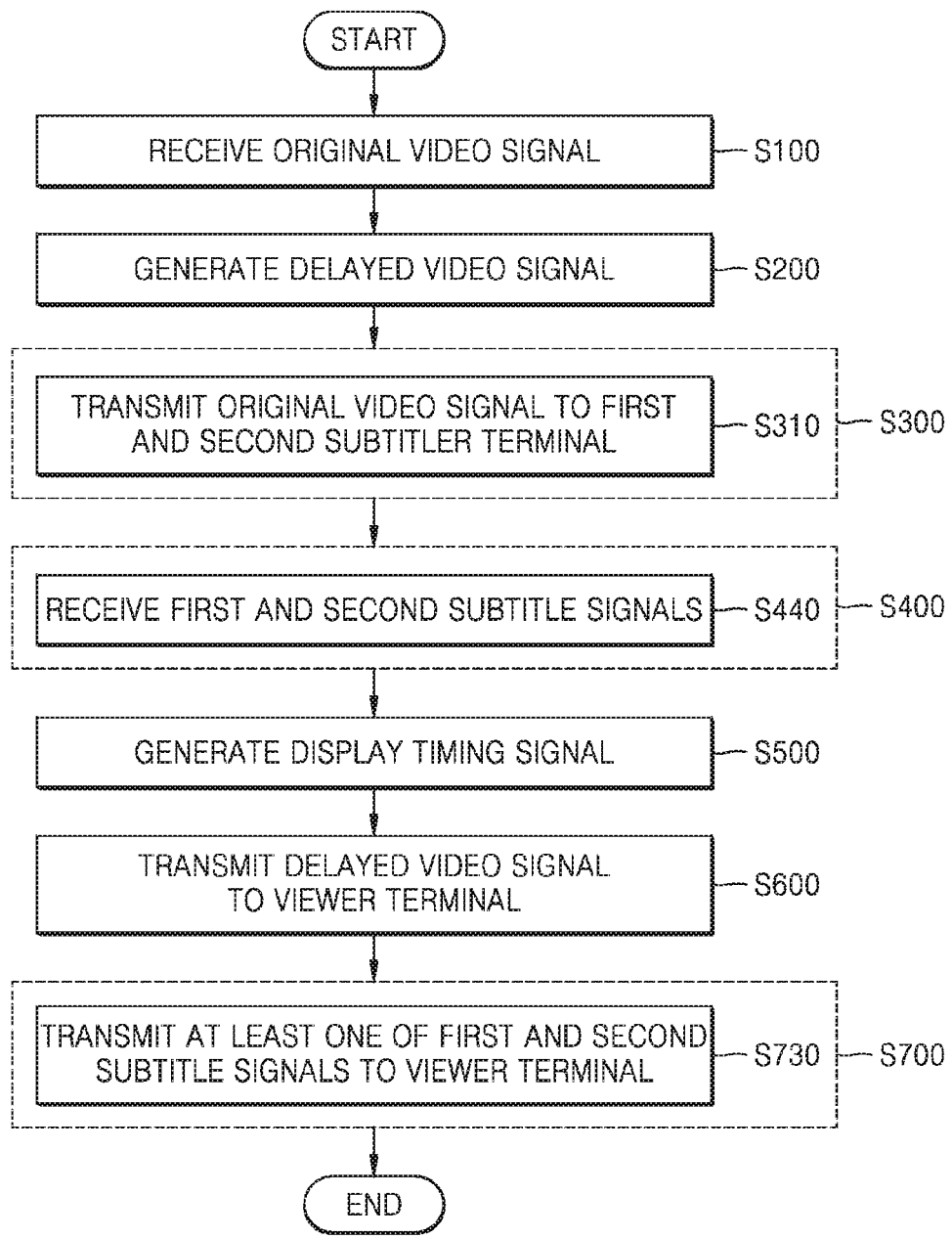
Figure 16:
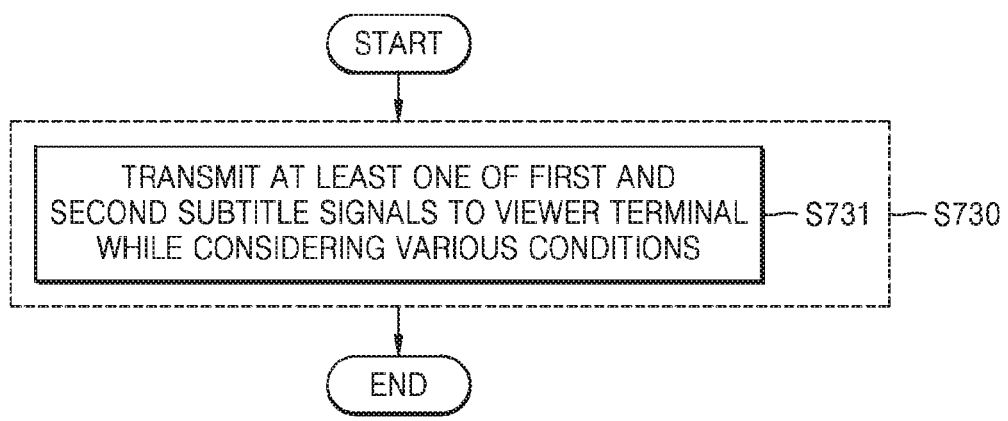

Selectively, according to an embodiment of FIG. 15, operation S300 of the video providing method may include transmitting the original video signal to the first and second subtitler terminals 300a and 300b (operation S310), operation S400 may include receiving first and second subtitle signals respectively from the first and second subtitler terminals 300a and 300b (operation S440), and operation S700 may include transmitting at least one of the first and second subtitle signals to the viewer terminal 400.

In other words, there may be a plurality of the subtitler terminals 300 that transmit and receive a video signal and a subtitle signal to and from one video providing apparatus 100. Also, the video providing apparatus 100 may transmit at least one of the first and second subtitle signals to the viewer terminal 400.

Here, selectively, the video providing apparatus 100 may transmit at least one of the first and second subtitle signals to the viewer terminal 400 while considering various conditions. In other words, according to an embodiment of FIG. 16, operation S730 of the vide providing method may include transmitting at least one of the first and second subtitle signals while considering various conditions (operation S731).

The various conditions considered by the video providing apparatus 100 may include a request from the viewer terminal 400, nationality information of a location where the viewer terminal 400 exists, language information used in a corresponding country, whether a particular subtitle signal is assigned from the viewer terminal 400, whether reception of a particular subtitle signal is denied by the viewer terminal 400, and a request of the subtitler terminal 300. In other words, for example, when the first viewer terminal 400a is an electronic apparatus in China, the video providing apparatus 100 may transmit only a subtitle signal in Chinese to the first viewer terminal 400a. As another example, when the second viewer terminal 400b has denied reception of the first subtitle signal, the video providing apparatus 100 may transmit only the second subtitle signal to the second viewer terminal 400b.

Here, the video providing apparatus 100 may provide, to the viewer terminal 400, information that may be considered while the viewer terminal 400 assigns or denies a particular subtitle signal. Such information may include particular subtitle selection information of another viewer terminal 400, particular subtitle recommendation information of the other viewer terminal 400, particular subtitle recommendation information of the video supplier terminal 200, or information directly provided from the subtitler terminal 300. For example, the video providing apparatus 100 may provide, to the second viewer terminal 400b, information indicating that the first viewer terminal 400a selected the first subtitle signal, information that the first subtitle signal is recommended, or information that the video supplier terminal 200 disapproved the second subtitle signal. As another example, the video providing apparatus 100 may provide, to the second viewer terminal 400b, information about the subtitles provided by the subtitler terminal 300 (for example, information indicating that the subtitles may include slangs or information that he/she has prepared the subtitles for the first time).

The video providing apparatus 100 may transmit a plurality of subtitle signals to the viewer terminal 400, and the viewer terminal 400 may select a particular subtitle signal and display only subtitles included in the signal. In addition, the video providing apparatus 100 may block transmission of a particular subtitle signal regardless of a request from the viewer terminal 400, or provide a subtitle signal arbitrarily selected by the viewer terminals 400, based on conditions pre-set in the video providing apparatus 100.

Figure 17:
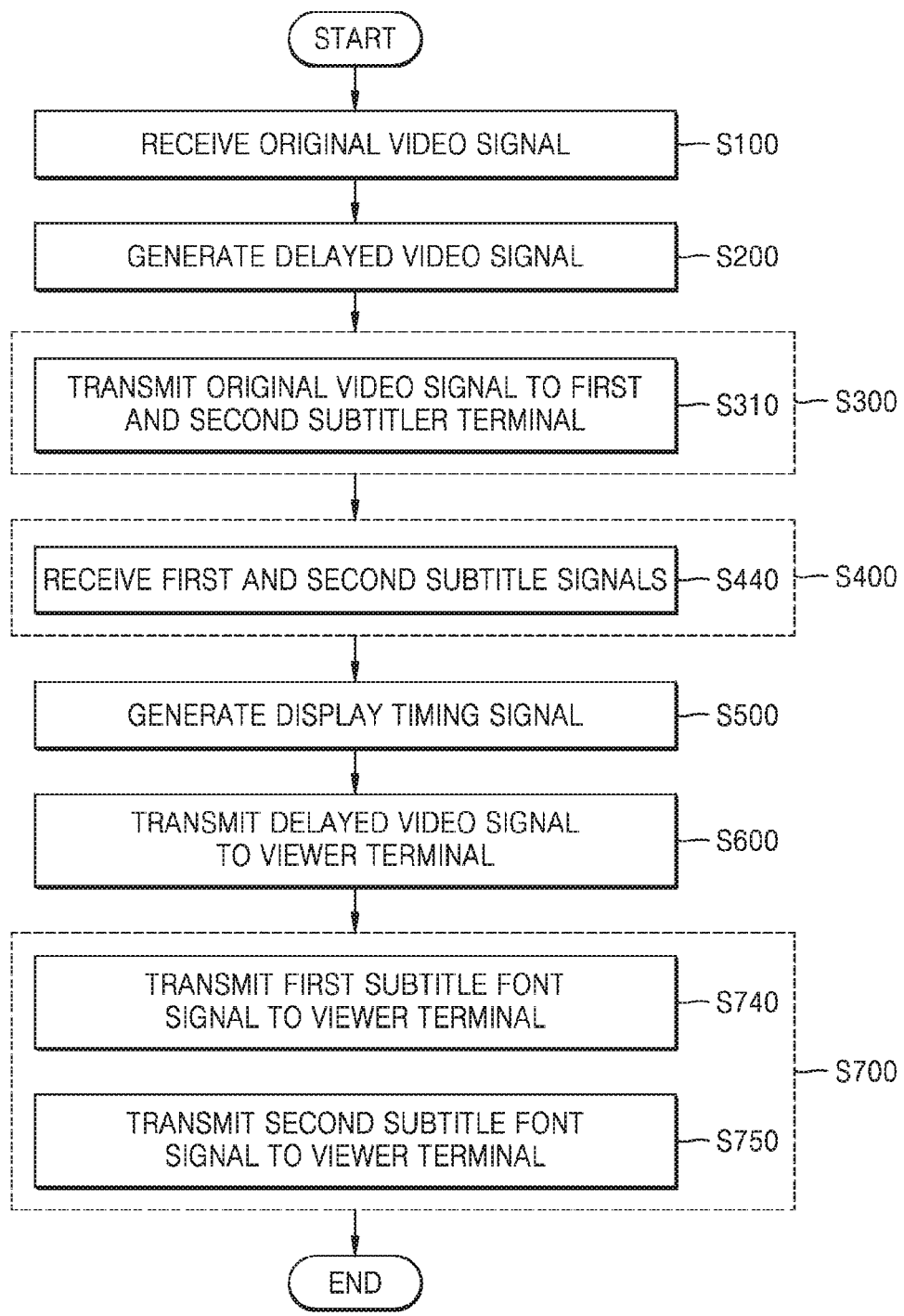

Also, selectively, according to an embodiment of FIG. 17, operation S700 of the video providing method may include transmitting a first subtitle font signal to the viewer terminal 400 (operation S740) and transmitting a second subtitle font signal to the viewer terminal 400 (operation S750). In detail, the video providing apparatus 100 may transmit, to the viewer terminal 400, the first subtitle font signal including information for displaying first subtitles in a first text size, a first text color, or a first font, together with the first subtitle signal. Similarly, the video providing apparatus 100 may transmit, to the viewer terminal 400, the second subtitle font signal including information for displaying second subtitles in a second text size, a second text color, or a second font, together with the second subtitle signal. Generally, the text size, the color, the font, etc. of subtitles may be determined by a terminal of a person watching a video, i.e., by the viewer terminal 400. However, the video providing apparatus 100 may transmit a subtitle font signal including information of the font of each of the first and second subtitles to the viewer terminal 400 such that the first subtitles received from the first subtitler terminal 300a and the second subtitles received from the second subtitler terminal 300b are distinguishably displayed on the viewer terminal 400. Here, the first and second subtitle font signals may be signals directly generated by the video providing apparatus 100, or may be signals received respectively from the first and second subtitler terminals 300a and 300b. The video providing apparatus 100 may not transmit a separate subtitle font signal to the viewer terminal 400, but the viewer terminal 400 may directly determine and display a font of each subtitle.

Figure 18:
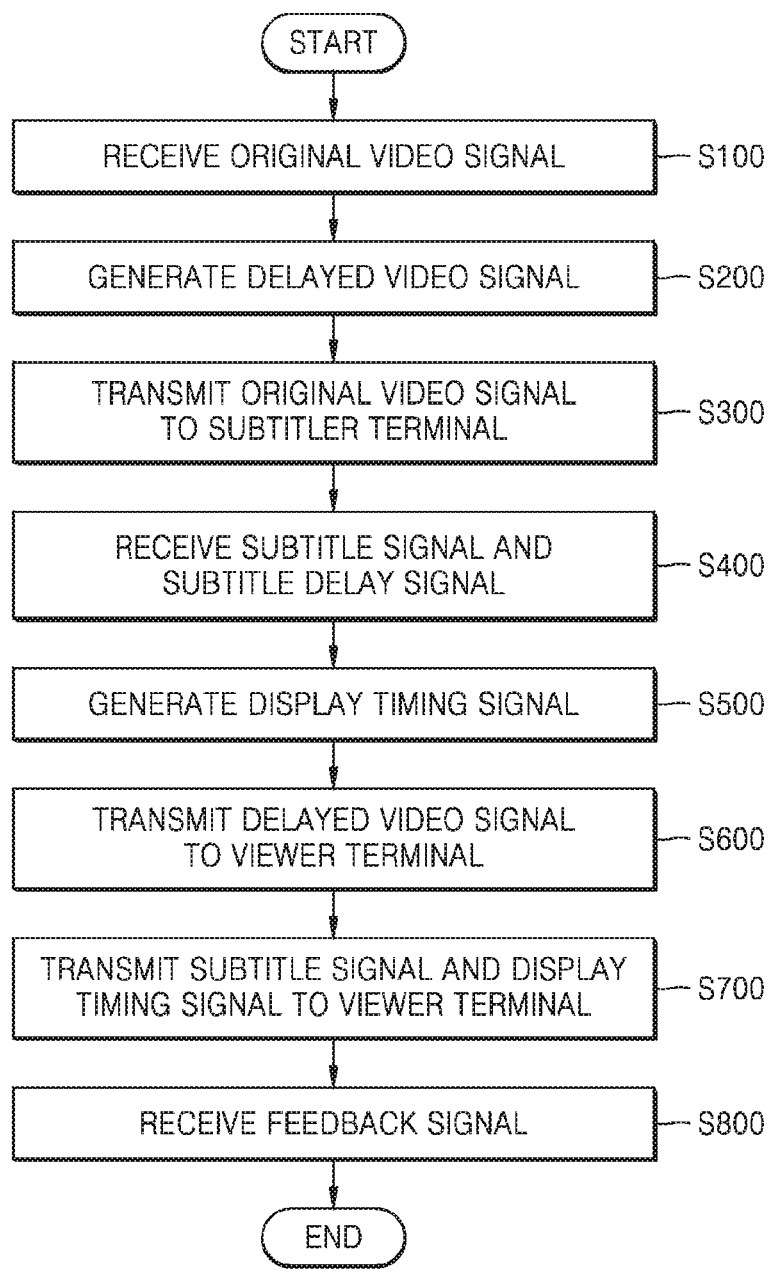

Selectively, according to an embodiment of FIG. 18, the video providing method may further include, after operation S700, receiving a feedback signal (operation S800). In other words, the video providing apparatus 100 may receive a feedback signal from the viewer terminal 400. The feedback signal may include evaluation regarding the provided subtitles. In detail, the video providing apparatus 100 may receive, from the viewer terminal 400, a feedback signal including information about various types of feedback, such as feedback indicating that translation of the subtitles is not correct, feedback indicating that the subtitles and the video are not synchronized well, and feedback indicating that the subtitles are satisfactory. The feedback signal may be received by the communication unit 110 of the video providing apparatus 100.

Figure 19:
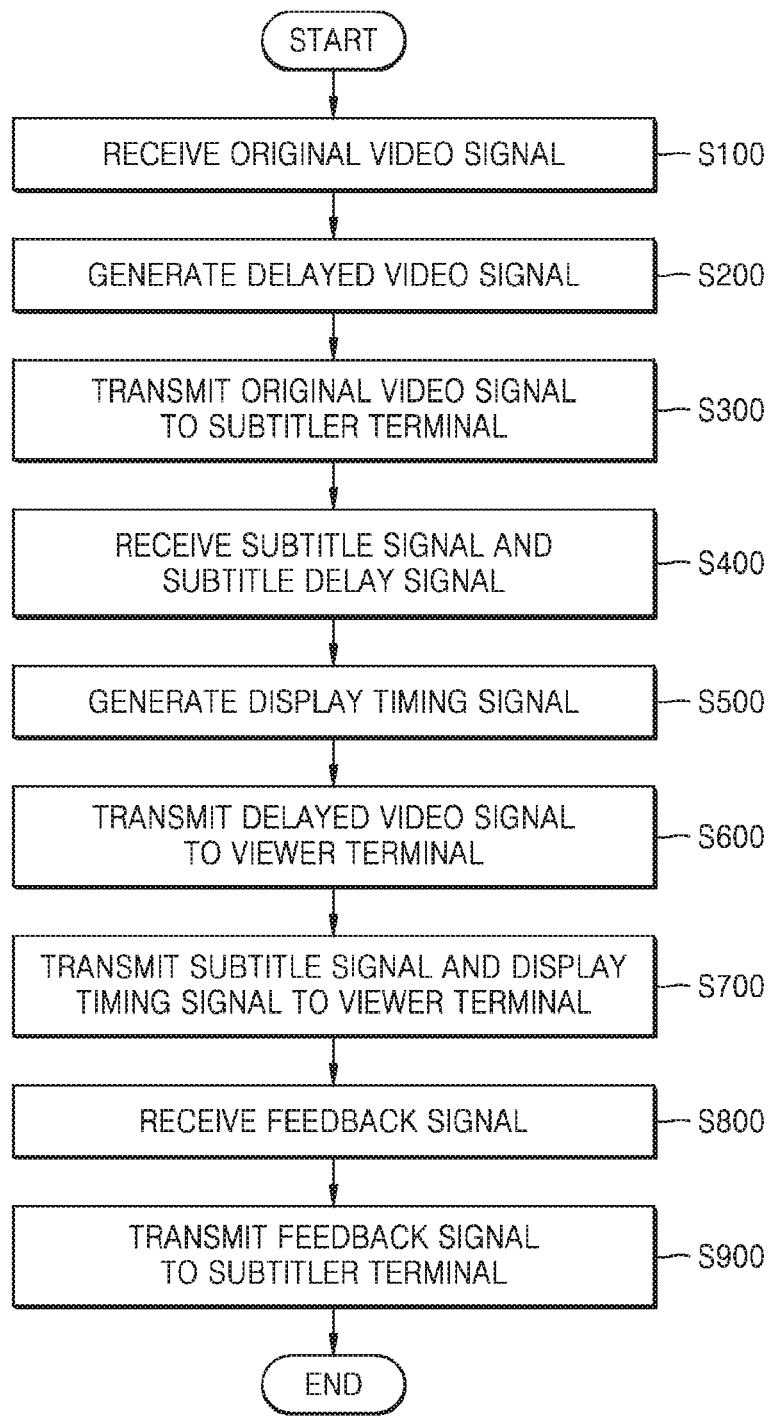

Also, according to an embodiment of FIG. 19, the video providing apparatus 100 may transmit the feedback signal to the subtitler terminal 300. In other words, the video providing method may further include, after operation S800, transmitting the feedback signal to the subtitler terminal 300 (operation S900). The feedback signal may be transmitted by the communication unit 110 of the video providing apparatus 100.

According to operation S800, the video providing apparatus 100 may obtain feedback of viewers with respect to the whole of the current video providing system 10. Also, according to operation S900, the video providing apparatus 100 may provide information about feedback of viewers regarding the subtitles of the subtitler terminal 300 to the user of the subtitler terminal 300.

Figure 20:
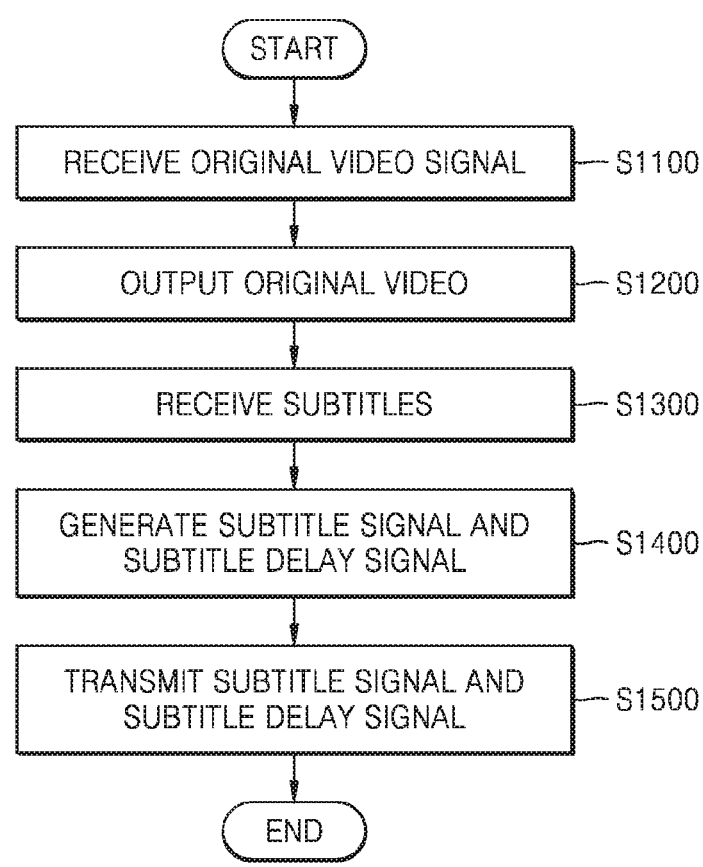

Referring to FIG. 20, the subtitler terminal 300 may receive the original video signal from the video providing apparatus 100 (operation S1100). The original video signal may be received by the communication unit 310 of the subtitler terminal 300.

Then, the subtitler terminal 300 may output the original video (operation S1200). In other words, the subtitler terminal 300 may reproduce the original video such that the user of the subtitler terminal 300 may personally prepare the subtitles while watching the original video. The original video may be output by the output unit 303 of the subtitler terminal 300.

Then, the subtitler terminal 300 may receive the subtitles in operation S1300. Here, the user of the subtitler terminal 300 may input the subtitles through an input device, such as a keyword or a touchpad, input the subtitles in voice via a microphone, or select at least some characters from pre-set idioms or pre-prepared subtitles and input the characters as at least some of the subtitles to be input.

Also, the subtitler terminal 300 may receive the subtitles automatically generated by an automatic translation computer program inside or outside the subtitler terminal 300. In other words, the subtitler terminal 300 may receive subtitles automatically generated by a computer algorithm, instead of subtitles directly input by the user of the subtitler terminal 300, who is a natural person. Also, despite the expression 'the subtitles are received', the subtitler terminal 300 may automatically generate the subtitles by using an automatic translation computer program or a voice recognition computer program installed in the subtitler terminal 300, in operation S1300. Such an operation of receiving the subtitles may be performed by the input unit 320 of the subtitler terminal 300.

Then, the subtitler terminal 300 may generate the subtitle signal and the subtitle delay signal, in operation S1400. The subtitler terminal 300 may generate the subtitle signal including information of the subtitles received from the user. Here, the subtitle signal may be a signal prepared in a programming language interpretable by the video providing apparatus 100 or the viewer terminal 400. Also, the subtitle signal may be an electronic signal generated such as to be transmitted through the communication unit 310 of the subtitler terminal 300 and received by the communication unit 110 of the video providing apparatus 100. As described above, the subtitle delay signal may be a signal including information for delaying the display of the subtitles. The subtitle signal and the subtitle delay signal may be generated by the controller 340 of the subtitler terminal 300.

Then, the subtitler terminal 300 may transmit the subtitle signal and the subtitle delay signal to the video providing apparatus 100. The subtitle signal and the subtitle delay signal may be transmitted by the communication unit 310 of the subtitler terminal 300.

Figure 21:
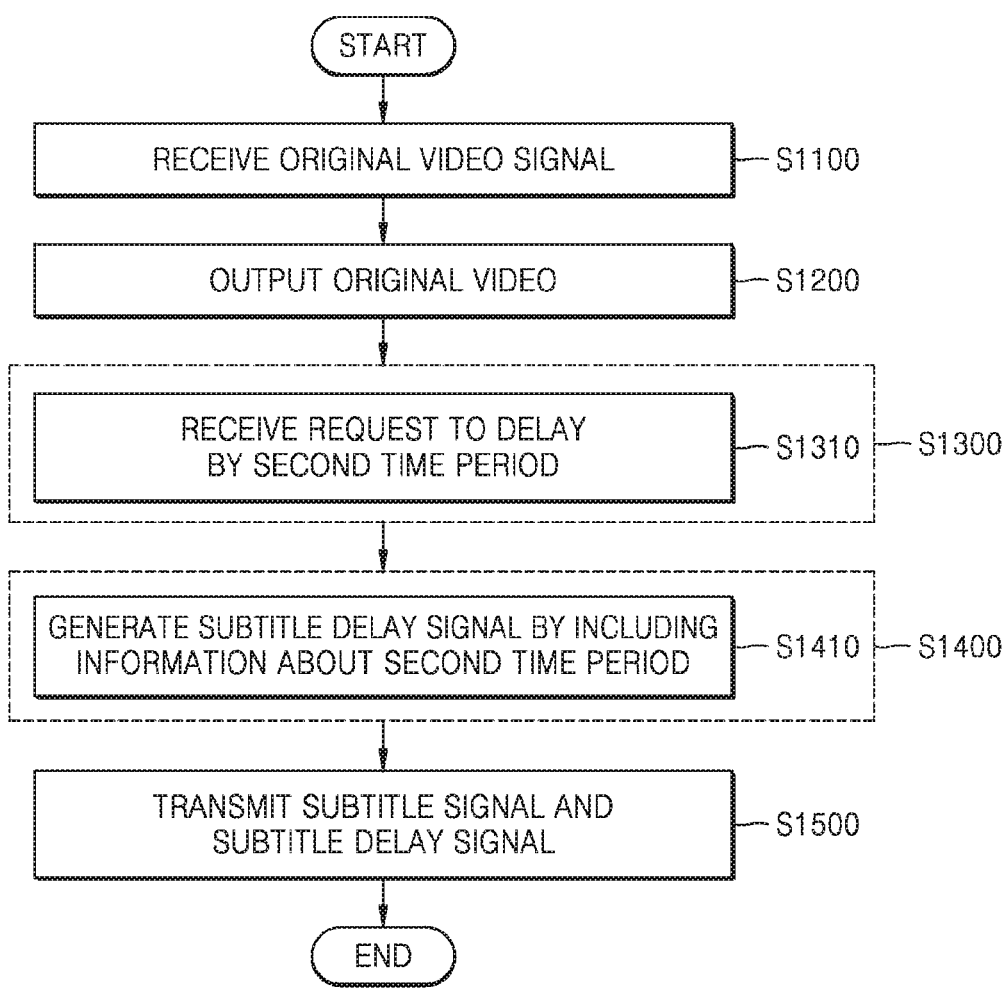

Selectively, according to an embodiment of FIG. 21, operation S1300 of the video providing method may include inputting a request to delay the display of the subtitles by the second time period (operation S1310), and operation S1400 may include generating the subtitle delay signal by including the information about the second time period. In detail, the user of the subtitler terminal 300 may estimate the time consumed while inputting the subtitles, i.e., the second time period. In this case, the subtitler terminal 300 may receive a request to display the subtitles by delaying the display by the second time period from the user. Then, the subtitler terminal 300 may generate the subtitle delay signal including the information about the second time period.

According to a video providing method of the present disclosure, an original video is provided to a viewer terminal after being delayed by a certain time, and subtitles may be received from a subtitler terminal for the delayed time and then provided to the viewer terminal. Also, according to a video providing method of the present disclosure, information about a timing when subtitles are to be displayed may be provided to a viewer terminal together with the subtitles such that the subtitles are displayed at a right timing on a video provided to the viewer terminal.

One or more of the above embodiments may be embodied in the form of a computer program that can be run in a computer through various elements. The computer program may be recorded on a computer-readable recording medium. Examples of the computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Furthermore, the non-transitory computer-readable recording medium may be a formless medium that can be transmitted and distributed in a network, e.g., software or an application.

The computer programs may be specially designed or well known to one of ordinary skill in the computer software field. Examples of the computer programs include code prepared by a compiler, and high-level languages executable by a computer by using an interpreter.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

It should be understood that embodiments described herein should be considered in a descriptive sense only and not for purposes of limitation. Descriptions of features or aspects within each embodiment should typically be considered as available for other similar features or aspects in other embodiments.

Embodiments of the present disclosure are related to a video providing apparatus, a video providing method, and a computer program, and are usable in a video providing apparatus, a video providing method, and a computer program, which provide high convenience to a user watching a video by providing an original video to a viewer terminal by delaying the original video by a certain time, providing subtitles to the viewer terminal by receiving the subtitles from a subtitler terminal during the delayed time, and providing information about a timing of displaying the subtitles to the viewer terminal together with the subtitles such that the subtitles are displayed at a right timing on the video provided to the viewer terminal.

The invention claimed is:

1. A video providing method for providing a video by a server to a viewer terminal through a communication network, comprising:
  receiving, by a communication unit of the server, an original video signal comprising information of an original video;
  generating, by a controller of the server, a delayed video signal comprising information of a delayed video in which the original video is delayed by a first time period;
  transmitting, by the communication unit of the server, the original video signal to a subtitler terminal;
  receiving, by the communication unit of the server from the subtitler terminal, a subtitle signal comprising information of subtitles with respect to the original video and a subtitle delay signal comprising information for delaying a display of the subtitles;
  generating, by the controller of the server, a display timing signal indicating a timing of displaying the subtitles on the delayed video, based on the subtitle delay signal;
  transmitting, by the communication unit of the server, the delayed video signal to the viewer terminal; and
  transmitting, by the communication unit of the server, the display timing signal and the subtitle signal to the viewer terminal,
  wherein the viewer terminal is configured to reproduce the delayed video from the delayed video signal while displaying the subtitles on the delayed video based on the display timing signal and the subtitle signal received through the communication unit of the server.

2. The video providing method of claim 1, wherein the subtitle delay signal is a signal comprising information of a second time period, determined at the subtitler terminal, for delaying the display of the subtitles, and
  the generating of the display timing signal further comprises calculating, by the controller of the server, a first timing, and generating the display timing signal such that the subtitles are displayed on the delayed video at the first timing,
  wherein the first timing, obtaining by subtracting the second time period from the first time period, is delayed from a second timing determined by the time when the subtitler terminal transmitted the subtitle signal to the communication unit of the server.

3. The video providing method of claim 1, wherein the subtitle delay signal is a signal comprising information of a second time period for delaying the display of the subtitles,
  the receiving of the subtitle delay signal further comprises receiving, by the communication unit of the server, an input start timing signal indicating an input start timing of when the subtitles are input on the subtitler terminal by a user of the subtitle terminal, and
  the generating of the display timing signal further comprises calculating, by the controller of the server, a second timing and generating the display timing signal such that the subtitles are displayed on the delayed video at the second timing,
  wherein a third time obtained by subtracting the second time period from the first time period is delayed from the input start timing.

4. The video providing method of claim 1, wherein the subtitle delay signal is a signal comprising information of a feature of the subtitles, and
  the generating of the display timing signal further comprises generating, by the controller, the display timing signal by determining a timing of displaying the subtitles based on the feature of the subtitles.

5. The video providing method of claim 1, wherein the transmitting of the subtitle signal to the viewer terminal further comprises transmitting, by the communication unit, a maintaining time signal comprising information of a display maintaining time for maintaining the display of the subtitles on a display unit of the viewer terminal.

6. The video providing method of claim 5, wherein the receiving of the subtitle delay signal further comprises receiving, by the communication unit, the maintaining time signal from the subtitler terminal.

7. The video providing method of claim 5, further comprising, before the transmitting of the subtitle signal to the viewer terminal, determining, by the controller, the display maintaining time based on a feature of the subtitles, and generating the maintaining time signal comprising information of the display maintaining time.

8. The video providing method of claim 1, wherein the transmitting of the subtitle signal to the viewer terminal further comprises transmitting, by the communication unit, a display location signal comprising information about a location where the subtitles are to be displayed on a display unit of the viewer terminal.

9. The video providing method of claim 8, further comprising, before the transmitting of the subtitle signal to the viewer terminal, generating, by the controller, the display location signal by determining the location where the subtitles are to be displayed in response to the subtitler terminal that transmitted the subtitle signal.

10. The video providing method of claim 8, wherein the receiving of the subtitle delay signal further comprises receiving, by the communication unit, the display location signal from the subtitler terminal.

11. The video providing method of claim 1, wherein the transmitting of the original video signal further comprises transmitting, by the communication unit, the original video signal to a first subtitler terminal and a second subtitler terminal, the receiving of the subtitle delay signal further comprises receiving, by the communication unit, a first subtitle signal comprising information of first subtitles from the first subtitler terminal and a second subtitle signal comprising information of second subtitles from the second subtitler terminal, and the transmitting of the subtitle signal further comprises transmitting, by the communication unit, at least one of the first subtitle signal and the second subtitle signal to the viewer terminal.

12. The video providing method of claim 11, wherein the transmitting of at least one of the first subtitle signal and the second subtitle signal further comprises transmitting, by the communication unit, at least one of the first subtitle signal and the second subtitle signal to the viewer terminal based on at least one of an attribute of the viewer terminal, a request from the viewer terminal, and a request of a video provider terminal that transmitted the original video signal to the communication unit.

13. The video providing method of claim 11, wherein the transmitting of the at least one of the first subtitle signal and the second subtitle signal to the viewer terminal further comprises:

transmitting, by the communication unit, a first subtitle font signal indicating to display the first subtitles in a first text size, a first text color, or a first font, together with the first subtitle signal; and transmitting, by the communication unit, a second subtitle font signal indicating to display the second subtitles in a second text size, a second text color, or a second font, together with the second subtitle signal.

14. The video providing method of claim 1, further comprising, after the transmitting of the subtitle signal to the viewer terminal, receiving, by the communication unit, a feedback signal comprising information of feedback with respect to the subtitles from the viewer terminal.

15. The video providing method of claim 14, further comprising, after the receiving of the feedback signal, transmitting, by the communication unit, the feedback signal to the subtitler terminal.

16. A non-transitory computer-readable recording medium storing a computer program for providing video to a viewer terminal through a communication network, the computer program when executed by a computer performing the steps comprising:

receiving, by a communication unit, an original video signal comprising information of an original video;

generating, by a controller, a delayed video signal comprising information of a delayed video in which the original video is delayed by a first time period;

transmitting, by the communication unit over a communication network, the original video signal to a subtitler terminal;

receiving, by the communication unit over a communication network from the subtitler terminal, a subtitle signal comprising information of subtitles with respect to the original video and a subtitle delay signal comprising information for delaying a display of the subtitles on the original video;

generating, by the controller, a display timing signal indicating a timing of displaying the subtitles on the delayed video, based on the subtitle delay signal;

transmitting, by the communication unit, the delayed video signal to a viewer terminal; and transmitting, by the communication unit, the display timing signal and the subtitle signal to the viewer terminal, wherein the viewer terminal is configured to reproduce the delayed video from the delayed video signal while displaying the subtitles on the delayed video based on the display timing signal and the subtitle signal received through the communication unit.

17. A video providing apparatus for providing a video to a viewer terminal through a communication network, comprising:

a communication unit configured to receive an original video signal comprising information of an original video, transmit the original video signal to a subtitler terminal, and receive, over a communication network, from the subtitler terminal, a subtitle signal comprising information of subtitles with respect to the original video and a subtitle delay signal comprising information for delaying a display of the subtitles on the original video; and a controller configured to generate a delayed video signal comprising information of a delayed video in which the original video is delayed by a first time period, and generate a display timing signal indicating a timing when the subtitles are to be displayed on the delayed video based on the subtitle delay signal, wherein the communication unit is further configured to transmit the delayed video signal, the display timing signal, and the subtitle signal to the viewer terminal, and wherein the viewer terminal is configured to reproduce the delayed video from the delayed video signal while displaying the subtitles on the delayed video based on the display timing signal and the subtitle signal received through the communication unit.

18. The video providing apparatus of claim 17, wherein the subtitle delay signal is a signal comprising information of a second time period, determined at the subtitler terminal, for delaying the display of the subtitles, and the controller is further configured to calculate a first timing, and generate the display timing signal such that the subtitles are displayed on the delayed video at the first timing, wherein the first timing, obtained by subtracting the second time period from the first time period, is delayed from a second timing determined by the time when the subtitler terminal transmitted the subtitle signal to the communication unit.

19. The video providing method of claim 1, wherein the display timing signal is transmitted to the viewer terminal separately from the delayed video signal.

20. The video providing apparatus of claim 17, wherein the display timing signal is transmitted separately from the delayed video signal.

* * * * *